(12) United States Patent
Alcala Perez et al.

(10) Patent No.: US 10,333,810 B2
(45) Date of Patent: Jun. 25, 2019

(54) CONTROL SYSTEM WITH ASYNCHRONOUS WIRELESS DATA TRANSMISSION

(71) Applicant: Johnson Controls Technology Company, Plymouth, MI (US)

(72) Inventors: Carlos Felipe Alcala Perez, Milwaukee, WI (US); Kirk H. Drees, Cedarburg, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 31 days.

(21) Appl. No.: 15/619,203

(22) Filed: Jun. 9, 2017

(65) Prior Publication Data

US 2018/0356808 A1    Dec. 13, 2018

(51) Int. Cl.
| | |
|---|---|
| *G05B 23/02* | (2006.01) |
| *H04L 29/08* | (2006.01) |
| *H04L 12/26* | (2006.01) |
| *G05B 19/042* | (2006.01) |

(52) U.S. Cl.
CPC ............ *H04L 43/08* (2013.01); *G05B 19/042* (2013.01); *H04L 67/1095* (2013.01); *G05B 2219/15117* (2013.01)

(58) Field of Classification Search
None
See application file for complete search history.

(56) References Cited

U.S. PATENT DOCUMENTS

| | | |
|---|---|---|
| 3,763,490 A | 10/1973 | Hadley et al. |
| 3,864,639 A | 2/1975 | Musgrave et al. |
| 4,755,795 A | 7/1988 | Page |
| 5,355,305 A | 10/1994 | Seem et al. |
| 5,506,768 A | 4/1996 | Seem et al. |
| 5,977,957 A | 11/1999 | Miller et al. |

(Continued)

FOREIGN PATENT DOCUMENTS

| | | |
|---|---|---|
| WO | WO-2013/006219 | 1/2013 |
| WO | WO-2014/085137 | 6/2014 |

OTHER PUBLICATIONS

U.S. Appl. No. 15/618,492, filed Jun. 9, 2017, Johnson Controls Technology Company.

(Continued)

*Primary Examiner* — Ramesh B Patel

(74) *Attorney, Agent, or Firm* — Foley & Lardner LLP

(57) ABSTRACT

A control system with asynchronous wireless data transmission includes a wireless sensor and a controller. The wireless sensor includes a measurement device configured to collect a plurality of samples of a measured variable at a plurality of different sampling times, a transmission generator configured to generate a compressed data object containing the plurality of samples of the measured variable, and a wireless radio configured to transmit the compressed data object at a transmission time asynchronous with at least one of the sampling times. The controller includes an object decompressor configured to extract the plurality of samples of the measured variable from the compressed data object and a feedback controller configured to use one or more of the extracted samples of the measured variable to modulate a control signal for a plant that operates to affect the measured variable.

20 Claims, 12 Drawing Sheets

(56) References Cited

U.S. PATENT DOCUMENTS

| | | |
|---|---|---|
| 6,414,866 B2 | 7/2002 | Huggett et al. |
| 6,937,909 B2 | 8/2005 | Seem |
| 7,024,336 B2 | 4/2006 | Salsbury et al. |
| 7,145,322 B2 | 12/2006 | Solveson et al. |
| 7,289,936 B2 | 10/2007 | Singhal et al. |
| 7,505,877 B2 | 3/2009 | Salsbury |
| 7,522,071 B2 | 4/2009 | Caselli et al. |
| 7,537,171 B2 * | 5/2009 | Mueller ............. F23N 5/203 236/51 |
| 7,827,813 B2 * | 11/2010 | Seem ............. F24F 11/0001 62/186 |
| 8,022,822 B2 * | 9/2011 | Liang ............. H04L 45/48 340/539.1 |
| 8,096,140 B2 | 1/2012 | Seem |
| 8,446,530 B2 | 5/2013 | Bellers |
| 8,473,080 B2 * | 6/2013 | Seem ............. F25B 49/027 700/28 |
| 8,495,888 B2 | 7/2013 | Seem |
| 8,620,628 B2 | 12/2013 | Yu et al. |
| 9,225,793 B2 | 12/2015 | Dutta et al. |
| 2001/0038316 A1 | 11/2001 | Kondoh |
| 2002/0019725 A1 * | 2/2002 | Petite ............. G05B 23/0208 702/188 |
| 2003/0040279 A1 * | 2/2003 | Ballweg ............. G05D 23/1905 455/66.1 |
| 2005/0221514 A1 | 10/2005 | Pasadyn et al. |
| 2008/0082180 A1 * | 4/2008 | Blevins ............. G05B 11/42 700/29 |
| 2010/0204808 A1 * | 8/2010 | Thiele ............. G05B 17/02 700/30 |
| 2012/0170639 A1 | 7/2012 | Salsbury |
| 2013/0015955 A1 | 1/2013 | Luong |
| 2013/0197676 A1 | 8/2013 | Salsbury et al. |
| 2013/0346460 A1 | 12/2013 | Bruneau et al. |
| 2014/0101420 A1 | 4/2014 | Wu |
| 2014/0297210 A1 * | 10/2014 | Kamel ............. H02J 13/0006 702/62 |
| 2014/0316743 A1 * | 10/2014 | Drees ............. G05B 15/02 702/184 |
| 2015/0167996 A1 * | 6/2015 | Fadell ............. F24F 11/006 700/276 |
| 2015/0316907 A1 * | 11/2015 | Elbsat ............. G06Q 10/04 700/275 |
| 2016/0231755 A1 * | 8/2016 | Ajax ............. G05B 15/02 |
| 2017/0023272 A1 | 1/2017 | Erickson et al. |
| 2017/0293293 A1 * | 10/2017 | Brownie ............. G05B 23/0243 |

OTHER PUBLICATIONS

Salsbury et al., Method for Adaptive Adjustment of the Sample Rate in PRAC-PI Controllers, Oct. 12, 2012, 12 pages.
Seem, A New Pattern Recognition Adaptive Controller with Application to HVAC Systems, 1998, 14 pages.
Swan, The Language of BACnet-Objects, Properties and Services, http://www.bacnet.org/Bibliography/ES-7-96/ES-7-96.htm, retrieved on Apr. 21, 2017, 11 pages.
Vasyutynskyy et al., A Comparative Study of PID Control Algorithms Adapted to Send-on-Delta Sampling, 2010, 18 pages.
Search Report and Written Opinion for International Application No. PCT/US2017/012399, dated Mar. 27, 2017, 14 pages.
Office Action for U.S. Appl. No. 15/618,492, dated Sep. 13, 2018, 28 pages.

* cited by examiner

CONTROL SYSTEM WITH ASYNCHRONOUS WIRELESS DATA TRANSMISSION

BACKGROUND

The present disclosure relates generally to a control system for a building and more particularly to a control system which transmits measurements from a wireless sensor to a controller.

To increase battery life in wireless feedback control applications (e.g., zone temperature control) fixed and dynamic sampling strategies have recently been developed. These strategies are able to significantly reduce the wireless sensor radio transmission rate while providing near equal closed loop performance when compared to traditional deterministic sampling schemes. While these new sampling strategies work well for feedback control, they may not be ideal for supporting data-based analytics (e.g., monitoring, fault detection, causal analysis, etc.) since much less data is provided to the analytics and the data intervals may not be uniform.

SUMMARY

One implementation of the present disclosure is a control system with asynchronous wireless data transmission. The control system includes a wireless sensor and a controller. The wireless sensor includes a measurement device configured to collect a plurality of samples of a measured variable at a plurality of different sampling times, a transmission generator configured to generate a compressed data object containing the plurality of samples of the measured variable, and a wireless radio configured to transmit the compressed data object at a transmission time asynchronous with at least one of the sampling times. The controller includes an object decompressor configured to extract the plurality of samples of the measured variable from the compressed data object and a feedback controller configured to use one or more of the extracted samples of the measured variable to modulate a control signal for a plant that operates to affect the measured variable.

In some embodiments, the wireless sensor includes a measurement database and a measurement logger configured to store the plurality of samples in the measurement database. Each sample stored in the measurement database may include a time attribute indicating the sampling time at which the sample is collected and a value attribute indicating a value of the measured variable at the sampling time.

In some embodiments, the transmission generator is configured to use the time attributes of the samples stored in the measurement database to identify the sampling time at which each sample was collected and select each of the samples that were collected between the transmission time and a previous transmission time for inclusion in the compressed data object.

In some embodiments, an amount of time that elapses between consecutive samples of the measured variable defines a sampling period and an amount of time that elapses between consecutive transmissions from the wireless sensor to the controller defines a transmission period. The sampling period may be substantially shorter than the transmission period such that multiple samples of the measured variable are collected within a single transmission period.

In some embodiments, the wireless sensor includes a transmission timing controller configured to set the transmission period to a fixed multiple of the sampling period and set the transmission time to be synchronous with an end of the transmission period In some embodiments, the wireless sensor includes a transmission timing controller configured to identify a value of the measured variable associated with each of the plurality of samples and dynamically set the transmission time based on one or more of the identified values of the measured variable. In some embodiments, the transmission timing controller is configured to calculate a delta value upon collecting each sample of the measured variable. The delta value may indicate an amount by which a current value of the measured variable deviates from a most recent value of the measured variable transmitted to the controller. The transmission timing controller can cause the compressed data object to be generated and transmitted to the controller in response to a determination that the delta value exceeds a threshold value.

In some embodiments, the compressed data object includes each sample of the measured variable collected since a previous transmission time at which a previous compressed data object was sent from the wireless sensor to the controller.

In some embodiments, the controller includes a measurement database and the object decompressor is configured to store the extracted samples of the measured variable in the measurement database. Each sample stored in the measurement database may include a time attribute indicating the sampling time at which the sample is collected, a value attribute indicating a value of the measured variable at the sampling time, and a key attribute identifying the wireless sensor that collected the sample.

In some embodiments, the controller is configured to use the extracted samples of the measured variable to perform data-based analytics comprising at least one of fault detection and diagnostics, system identification, and noise estimation.

In some embodiments, at least one of the wireless sensor and the controller includes a deadband filter configured to filter each sample of the measured variable by adjusting the value of the measured variable based on whether the value of the measured variable is within a deadband range. In some embodiments, the deadband filter is configured to set the value of the measured variable equal to a setpoint for the measured variable in response to a determination that the value of the measured variable is within the deadband range.

In some embodiments, the deadband filter is configured to subtract a predetermined amount from the value of the measured variable in response to a determination that the value of the measured variable exceeds a maximum of the deadband range. In some embodiments, the deadband filter is configured to add the predetermined amount to the value of the measured variable in response to a determination that the value of the measured variable is less than a minimum of the deadband range.

Another implementation of the present disclosure is a method for asynchronously transmitting samples of a measured variable from a wireless sensor to a controller. The method includes collecting a plurality of samples of the measured variable at the wireless sensor at a plurality of different sampling times and generating, by the wireless sensor, a compressed data object containing the plurality of samples of the measured variable. The method includes transmitting the compressed data object from the wireless sensor to the controller via a wireless radio at a transmission time asynchronous with at least one of the sampling times, extracting the plurality of samples of the measured variable from the compressed data object at the controller, and using one or more of the extracted samples of the measured variable at the controller to modulate a control signal for a plant that operates to affect the measured variable.

In some embodiments, the method includes storing the plurality of samples in a measurement database within the wireless sensor. Each sample stored in the measurement database may include a time attribute indicating the sampling time at which the sample is collected and a value attribute indicating a value of the measured variable at the sampling time.

In some embodiments, the method includes using the time attributes of the samples stored in the measurement database to identify the sampling time at which each sample was collected and selecting each of the samples that were collected between the transmission time and a previous transmission time for inclusion in the compressed data object.

In some embodiments, an amount of time that elapses between consecutive samples of the measured variable defines a sampling period, an amount of time that elapses between consecutive transmissions from the wireless sensor to the controller defines a transmission period, and the sampling period is substantially shorter than the transmission period such that multiple samples of the measured variable are collected within a single transmission period.

In some embodiments, the method includes setting the transmission period to a fixed multiple of the sampling period and setting the transmission time to be synchronous with an end of the transmission period In some embodiments, the method includes identifying a value of the measured variable associated with each of the plurality of samples and dynamically setting the transmission time based on one or more of the identified values of the measured variable.

In some embodiments, the method includes calculating a delta value indicating an amount by which a current value of the measured variable deviates from a most recent value of the measured variable transmitted to the controller. The delta value may be calculated upon collecting each sample of the measured variable. The method may include causing the compressed data object to be generated and transmitted to the controller in response to a determination that the delta value exceeds a threshold value.

In some embodiments, the compressed data object includes each sample of the measured variable collected since a previous transmission time at which a previous compressed data object was sent from the wireless sensor to the controller.

In some embodiments, the method includes storing the extracted samples of the measured variable in a measurement database within the controller. Each sample stored in the measurement database may include a time attribute indicating the sampling time at which the sample is collected, a value attribute indicating a value of the measured variable at the sampling time, and a key attribute identifying the wireless sensor that collected the sample.

In some embodiments, the method includes filtering each sample of the measured variable using a deadband filter. The filtering may include adjusting the value of the measured variable based on whether the value of the measured variable is within a deadband range. In some embodiments, the filtering includes setting the value of the measured variable equal to a setpoint for the measured variable in response to a determination that the value of the measured variable is within the deadband range.

In some embodiments, the filtering includes subtracting a predetermined amount from the value of the measured variable in response to a determination that the value of the measured variable exceeds a maximum of the deadband range. In some embodiments, the filtering includes adding the predetermined amount to the value of the measured variable in response to a determination that the value of the measured variable is less than a minimum of the deadband range.

In some embodiments, the method includes using the extracted samples of the measured variable to perform data-based analytics comprising at least one of fault detection and diagnostics, system identification, and noise estimation.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
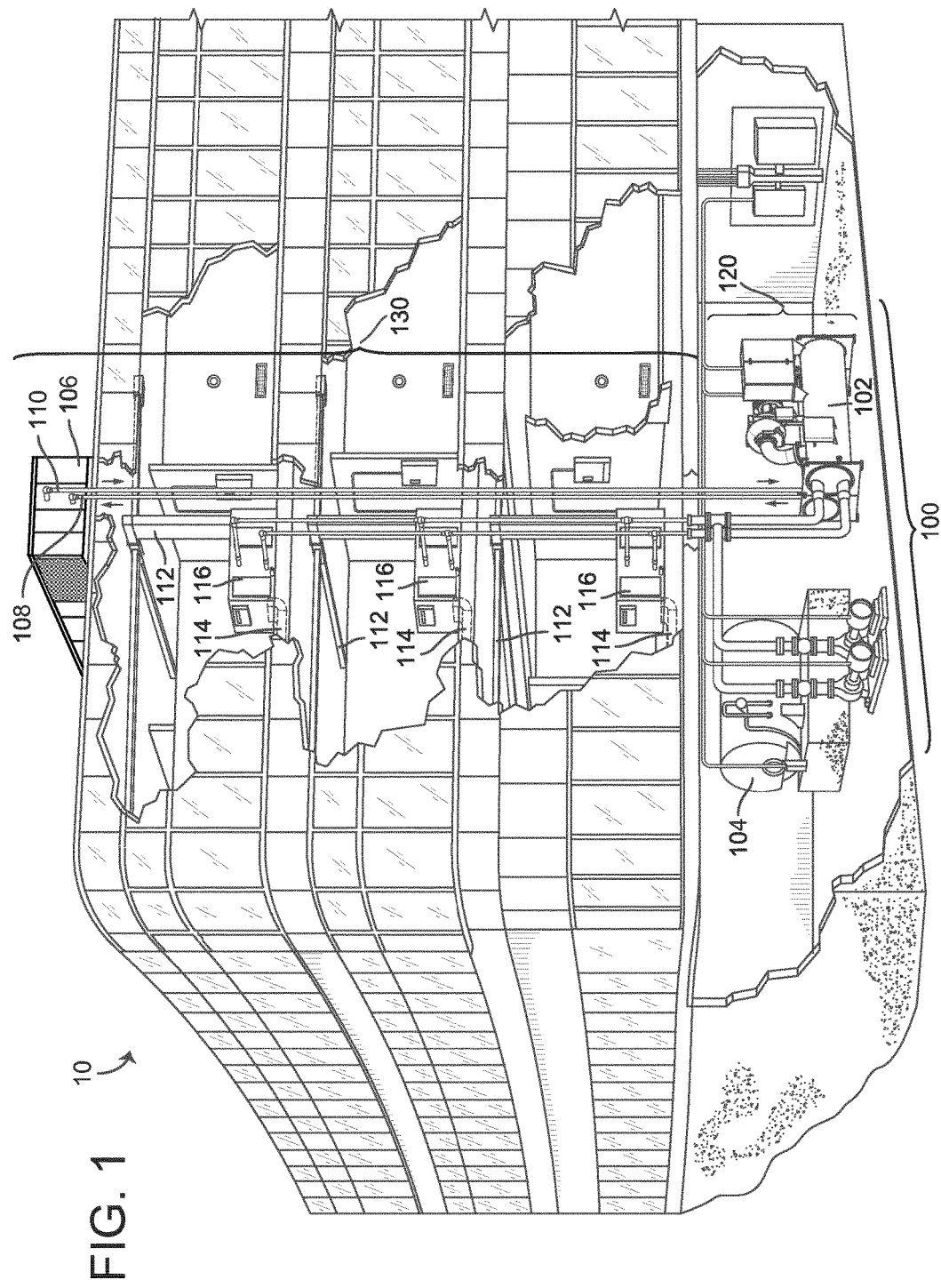
FIG. 1 is a drawing of a building equipped with a HVAC system, according to some embodiments.

Referring generally to the FIGURES, a control system with asynchronous wireless data transmission and components thereof are shown, according to various exemplary embodiments. To increase battery life in wireless feedback control applications (e.g., zone temperature control) fixed and dynamic sampling strategies have recently been developed. An example of such a dynamic sampling strategy is described in detail in U.S. patent application Ser. No. 15/618,492 filed Jun. 9, 2017, the entire disclosure of which is incorporated by reference herein. These strategies are able to significantly reduce the wireless sensor radio transmission rate while providing near equal closed loop performance when compared to traditional deterministic sampling schemes. While these new sampling strategies work well for feedback control, they may not be ideal for supporting data-based analytics (e.g., monitoring, fault detection, causal analysis, etc.) since much less data is provided to the analytics and the data intervals may not be uniform.

The systems and methods described herein can be used to reduce the battery power consumption of a wireless sensor while preserving the original data for data-based analytics. For example, a control system described herein includes a wireless sensor, a controller, and a plant. The wireless sensor can be configured to collect samples of the measured variable $y_p$ at regular intervals. The length of time between measurements collected by the wireless sensor is referred to herein as the measurement period and/or the measurement interval. The wireless sensor can store multiple measurements $y_p$ in memory contained within the wireless sensor. In some embodiments, the wireless sensor includes a filter (e.g., a deadband filter) configured to filter the measurements $y_p$ collected by the measurement device. The wireless sensor can use the filter to convert the measurements $y_p$ into filtered measurements $y_w$. In other embodiments, the filter may be a component of the controller.

The wireless sensor may include a wireless radio configured to wirelessly transmit measurements to the controller. The measurements transmitted to the controller can include the raw measurements $y_p$ and/or the filtered measurements $y_w$. The length of time between transmissions to the controller is referred to herein as the transmission period and/or the transmission interval. The transmission interval can be a regular interval (e.g., one transmission every ten minutes) or an irregular or dynamic interval (e.g., transmit when the measured variable $y_p$ changes by a threshold amount, etc.). The transmission interval may be significantly longer than the measurement interval such that multiple measurements are collected within each transmission interval. In some embodiments, the transmission timing is controlled by a transmission timing controller within the wireless sensor 602. The transmission timing is described in greater detail below.

In some embodiments, the wireless sensor transmits multiple measurements to the controller as part of a single transmission or message. For example, the wireless sensor can generate a compressed data object that includes multiple measurements. In some embodiments, the compressed data object includes all of the measurements that have been collected since the previous transmission to the controller. The compressed data object can then be transmitted to the controller via the wireless radio. Advantageously, this allows the wireless sensor to conserve battery power and reduce network traffic by reducing the number of transmissions while still preserving the data sampled at the faster measurement interval.

The controller can be configured to decompress the compressed data objects received from the wireless sensor and extract the multiple measurements. The controller can use the measurements as input to a feedback control process to calculate the controlled variable $u_c$ (e.g., a setpoint, a control signal, etc.). In various embodiments, the controller may be a proportional controller, a proportional-integral (PI) controller, a proportional-integral-derivative (PID) controller, a model predictive controller (MPC), and/or any other type of controller configured to generate an input $u_c$ to the plant as a function of the feedback received from the wireless sensor.

In some embodiments, the controller stores the extracted measurements in a measurement database along with a timestamp indicating a time at which the measurement was collected. Over time, the controller may receive and store all of the measurements collected by the wireless sensor at the faster measurement interval as part of compressed data objects transmitted at the slower transmission interval. This allows the controller and/or other systems or devices to use the full set of measurements to perform analytics that would not be possible if only one measurement were received in each transmission. For example, the controller can use the full set of measurements to analyze noise levels, calculate the frequency of oscillations of the measurements, or perform other analytics that require measurements collected at the faster measurement interval. These and other features of the control system are described in greater detail below.

Building HVAC Systems and Building Management Systems

Figure 2:
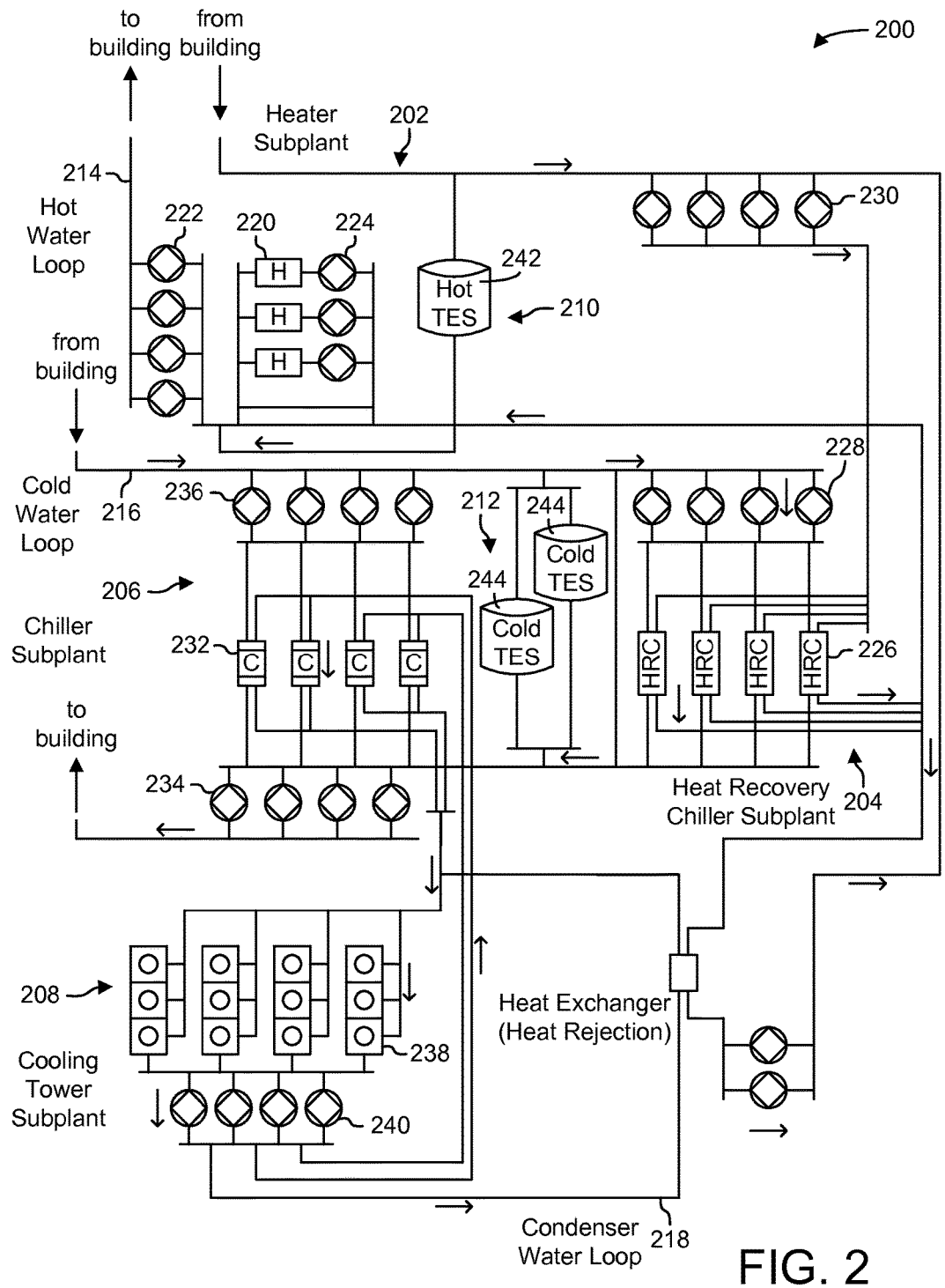
FIG. 2 is a block diagram of a waterside system that may be used in conjunction with the building of FIG. 1, according to some embodiments.
Figure 3:
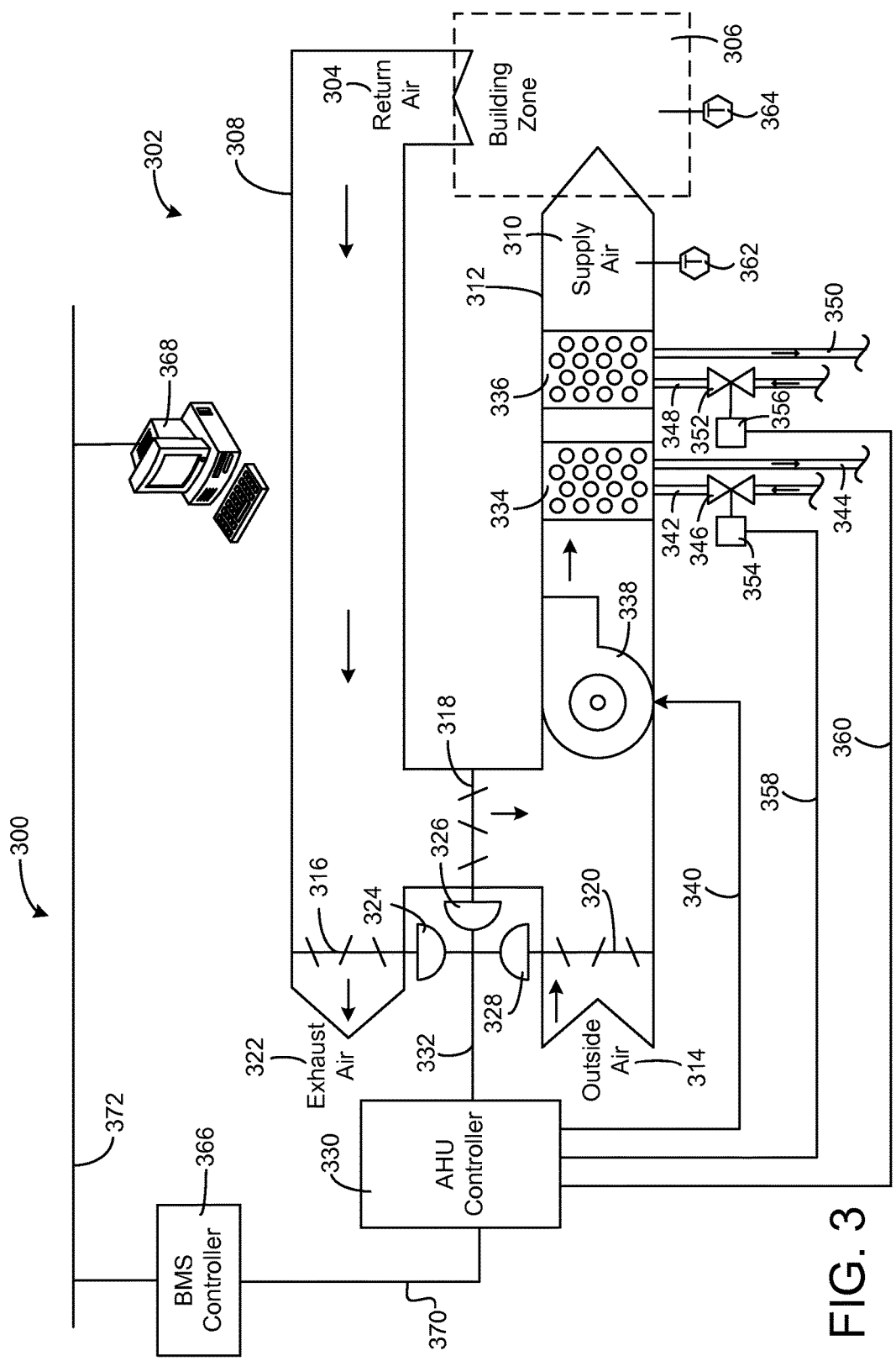
FIG. 3 is a block diagram of an airside system that may be used in conjunction with the building of FIG. 1, according to some embodiments.
Figure 4:
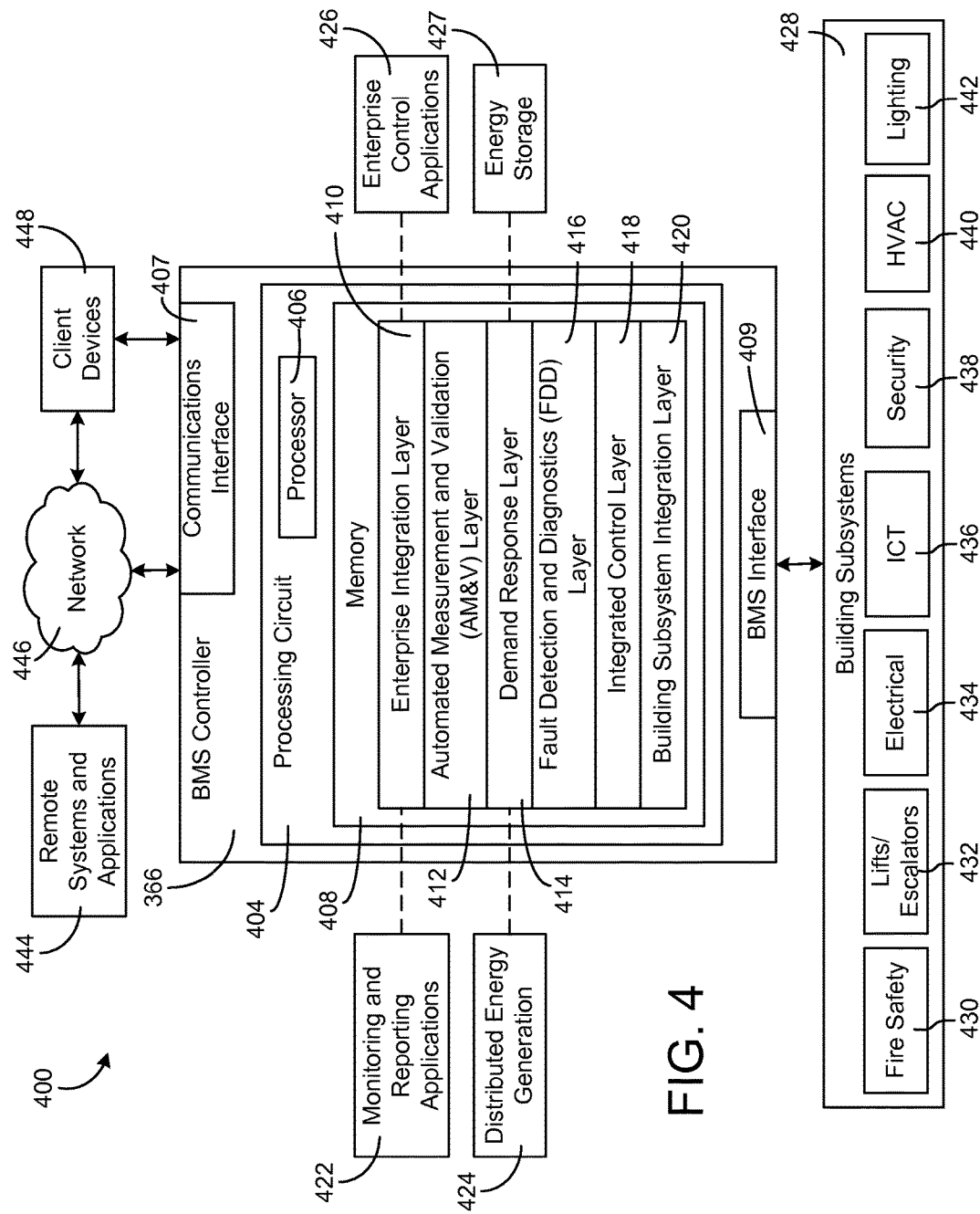
FIG. 4 is a block diagram of a building management system (BMS) which can be used to monitor and control the building of FIG. 1, according to some embodiments.
Figure 5:
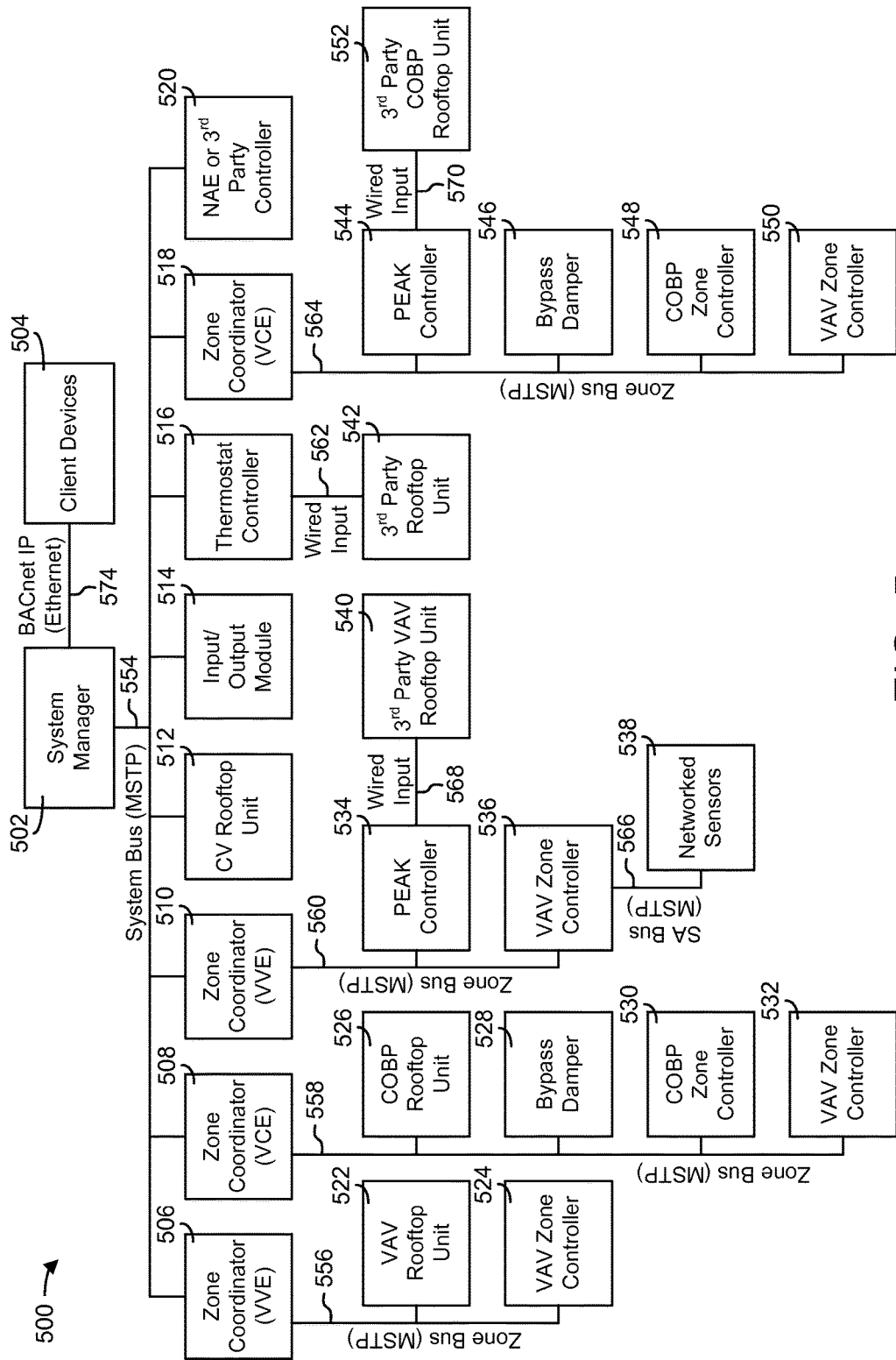
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130.

Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Control System with Asynchronous Wireless Data Transmission

Figure 6:
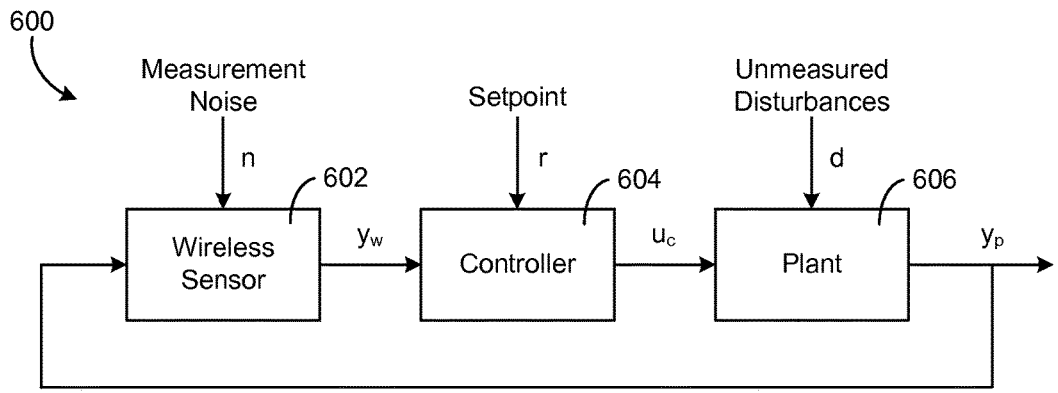
FIG. 6 is a block diagram of control system with asynchronous wireless data transmission from a wireless sensor to a controller, according to some embodiments.

Referring now to FIG. 6, a block diagram of control system 600 with asynchronous wireless data transmission is shown, according to an exemplary embodiment. To increase battery life in wireless feedback control applications (e.g., zone temperature control) fixed and dynamic sampling strategies have recently been developed. An example of such a dynamic sampling strategy is described in detail in U.S. patent application Ser. No. 15/618,492 filed Jun. 9, 2017, the entire disclosure of which is incorporated by reference herein. These strategies are able to significantly reduce the wireless sensor radio transmission rate while providing near equal closed loop performance when compared to traditional deterministic sampling schemes. While these new sampling strategies work well for feedback control, they may not be ideal for supporting data-based analytics (e.g., monitoring, fault detection, causal analysis, etc.) since much less data is provided to the analytics and the data intervals may not be uniform. Control system 600 is configured to reduce the battery power consumption of a wireless sensor while preserving the original data for data-based analytics.

Control system 600 is shown to include a wireless sensor 602, a controller 604, and a plant 606. A plant in control theory is the combination of a process and one or more mechanically-controlled outputs. In some embodiments, plant 606 includes one or more controllable HVAC components (e.g., chillers, heaters, actuators, fans, AHUs, RTUs, valves, etc.) that operate to affect an environmental condition within a building space. For example, plant 606 can include an air handling unit configured to control temperature within a building space via one or more mechanically-controlled actuators and/or dampers. Plant 606 can include any of the HVAC equipment described with reference to FIGS. 1-5. In various embodiments, plant 606 can include a chiller operation process, a damper adjustment process, a mechanical cooling process, a ventilation process, a refrigeration process, or any other process in which an input variable to plant 606 (i.e., controlled variable $u_c$) is adjusted to affect an output from plant 606 (i.e., measured variable $y_p$). Several examples of plant 606 are described with reference to FIGS. 7-9.

Wireless sensor 602 can be configured to record measurements of measured variable $y_p$ and transmit measurements to controller 604. Wireless sensor 602 may include a measurement device (e.g., a temperature sensor, humidity sensor, enthalpy sensor, pressure sensor, lighting sensor, flow rate sensor, voltage sensor, valve position sensor, etc.) configured to collect samples of measured variable $y_p$ from plant 606. In some embodiments, wireless sensor 602 includes multiple measurement devices, each configured to measure a different variable (e.g., temperature, humidity, pressure, etc.). In other embodiments, wireless sensor 602 includes a single measurement device configured to measure a single measured variable $y_p$.

Wireless sensor 602 may include an internal power source (e.g., a battery) configured to power the electronic components of wireless sensor 602. Wireless sensor 602 can draw power from the internal power source and use the power to transmit measurements to controller 604. In some embodiments, wireless sensor 602 receives power from an external power source such as an electric grid, a wireless charging source, radio frequency waves, or other external power sources. In other embodiments, wireless sensor 602 is powered exclusively by the internal power source.

Wireless sensor 602 can be configured to collect samples of the measured variable $y_p$ at regular intervals. For example, wireless sensor 602 may obtain a temperature measurement in a particular zone of a building every minute. The length of time between measurements collected by wireless sensor 602 is referred to herein as the measurement period and/or the measurement interval. Wireless sensor 602 can store multiple measurements $y_p$ in memory contained within wireless sensor 602. In some embodiments, wireless sensor 602 includes a filter (e.g., a deadband filter) configured to filter the measurements $y_p$ collected by the measurement device. Wireless sensor 602 can use the filter to convert the measurements $y_p$ into filtered measurements $y_w$. In other embodiments, the filter may be a component of controller 604.

Wireless sensor 602 may include a wireless radio configured to wirelessly transmit measurements to controller 604. The measurements transmitted to controller 604 can include the raw measurements $y_p$ and/or the filtered measurements $y_w$. The length of time between transmissions to controller 604 is referred to herein as the transmission period and/or the transmission interval. The transmission interval can be a regular interval (e.g., one transmission every ten minutes) or an irregular or dynamic interval (e.g., transmit when the measured variable $y_p$ changes by a threshold amount, etc.). The transmission interval may be significantly longer than the measurement interval such that multiple measurements are collected within each transmission interval. In some embodiments, the transmission timing is controlled by a transmission timing controller within wireless sensor 602. The transmission timing is described in greater detail with reference to FIG. 10.

In some embodiments, wireless sensor 602 transmits multiple measurements to controller 604 as part of a single transmission or message. For example, wireless sensor 602 can generate a compressed data object that includes multiple measurements. In some embodiments, the compressed data object includes all of the measurements that have been collected since the previous transmission to controller 604. The compressed data object can then be transmitted to controller 604 via the wireless radio. Advantageously, this allows wireless sensor 602 to conserve battery power and reduce network traffic by reducing the number of transmissions while still preserving the data sampled at the faster measurement interval.

Controller 604 can be configured to decompress the compressed data objects received from wireless sensor 602 and extract the multiple measurements. Controller 604 can use the measurements as input to a feedback control process to calculate the controlled variable $u_c$ (e.g., a setpoint, a control signal, etc.). In various embodiments, controller 604 may be a proportional controller, a proportional-integral (PI) controller, a proportional-integral-derivative (PID) controller, a model predictive controller (MPC), and/or any other type of controller configured to generate an input $u_c$ to plant 606 as a function of the feedback received from wireless sensor 602.

In some embodiments, controller 604 stores the extracted measurements in a measurement database along with a timestamp indicating a time at which the measurement was collected. Over time, controller 604 may receive and store all of the measurements collected by wireless sensor 602 at the faster measurement interval as part of compressed data objects transmitted at the slower transmission interval. This allows controller 604 and/or other systems or devices to use the full set of measurements to perform analytics that would not be possible if only one measurement were received in each transmission. For example, controller 604 can use the full set of measurements to analyze noise levels, calculate the frequency of oscillations of the measurements, or perform other analytics that require measurements collected at the faster measurement interval.

Figure 7:
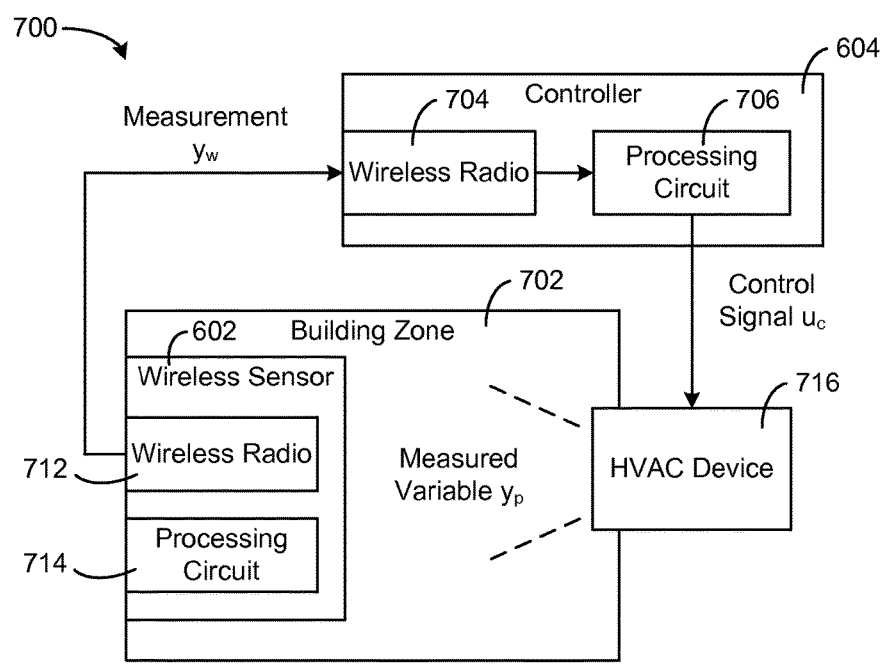
FIG. 7 is a block diagram of a system in which the wireless sensor and controller of FIG. 6 can be implemented, according to some embodiments.

Referring now to FIG. 7, an example of a system 700 in which wireless sensor 602 and controller 604 can be implemented is shown, according to an exemplary embodiment. System 700 is shown to include a building zone 702. Building zone 702 may include one or more rooms, offices, lobbies, and/or other areas of a building that may require heating, cooling, and/or other types of environmental control.

Wireless sensor 602 is shown to be located within zone 702. In some embodiments, wireless sensor 602 is part of a thermostat, remote sensor, Wi-Fi sensor, Zigbee Sensor, or other device configured to measure a variable state or condition within building zone 702. Wireless sensor 602 is shown to include processing circuit 714 and wireless radio 712. Processing circuit 714 may perform one or more operations causing wireless radio 712 to transmit measurements $y_w$ to controller 604. Processing circuit 714 may include one or more processors and/or memory devices, as described with reference to FIG. 10.

Controller 604 can be any building controller or other device that can cause HVAC device 716 to affect an environmental condition in zone 702 (e.g., AHU controller 330 and/or BMS controller 366). HVAC device 716 may be a residential outdoor unit, a furnace, a heat pump, an air conditioner, a variable air volume (VAV) unit (e.g., VAVs 116), a boiler (e.g., boiler 104), a chiller (e.g., chiller 102), an air handler and/or roof top unit (e.g., AHU 106) and/or any other HVAC device described herein. Controller 604 is shown to include wireless radio 704 and a processing circuit 706 both of which are described with reference to FIG. 10.

Controller 604 may communicate wirelessly with wireless sensor 602 via wireless radios 704 and 712. Wireless radio 704 can be configured to receive measured temperature values, humidity values, and/or other types of measurements $y_w$ from wireless radio 712 of sensor 602. Wireless radio 712 can be configured to send commands to wireless radio 704 such as historical read commands to read historical data (e.g., measured temperature values measured over a time horizon) that processing circuit 706 can be configured to store. Processing circuit 706 of controller 604 can be configured to generate control signals $u_c$ for HVAC device 716. In some embodiments, wireless radio 704 receives measured temperature values from wireless sensor 602 and causes HVAC device 716 to cause a change in the environmental conditions of zone 702 based on the measured temperature values.

Figure 8:
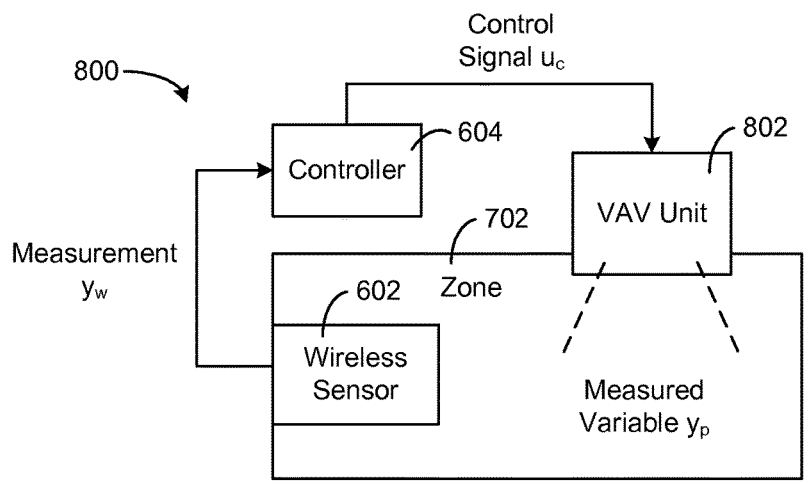
FIG. 8 is a block diagram of another system in which the wireless sensor and controller of FIG. 6 can be implemented, according to some embodiments.

Referring now to FIG. 8, another example of a system 800 in which wireless sensor 602 and controller 604 can be implemented is shown, according to an exemplary embodiment. In system 800, controller 604 is shown controlling a variable air volume (VAV) unit 802. Wireless sensor 602 may record measurements of measured variable $y_p$ and send measurements to controller 604. Controller 604 may use the measurements to generate control signals $u_c$ for VAV unit 802. In some embodiments, based on data received from wireless sensor 602, (e.g., measured temperature values of zone 702) controller 604 can control VAV unit 802 to cause environmental conditions of zone 702 to meet an environmental setpoint. VAV unit 802 may be a device that includes an damper that controls the airflow into zone 802. In this respect, controller 604 can be configured to generate control signals for the damper of VAV unit 802 and/or any other actuator of VAV unit 802. In some embodiments, VAV unit 802 is a VAV such as one of VAVs 116 as described with further reference to FIG. 1.

Figure 9:
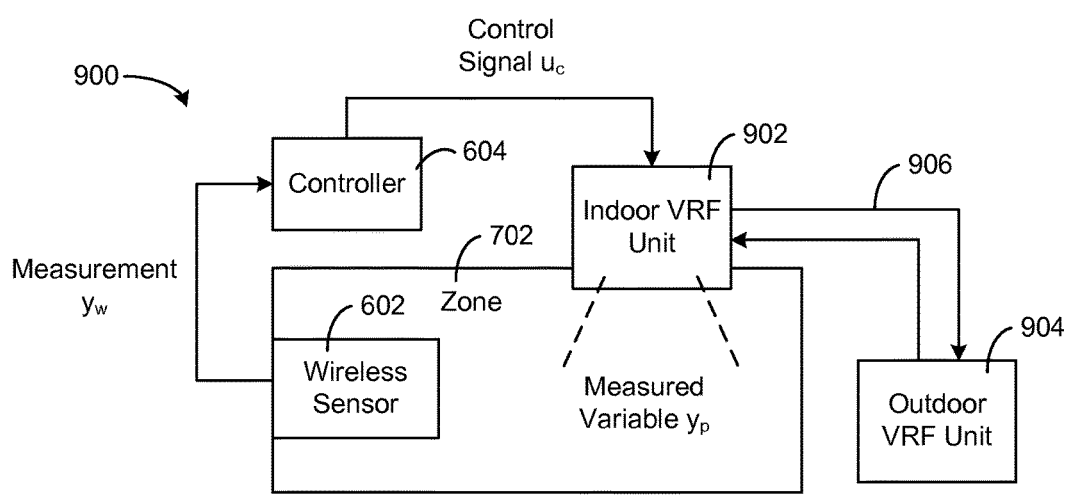
FIG. 9 is a block diagram of another system in which the wireless sensor and controller of FIG. 6 can be implemented, according to some embodiments.

Referring now to FIG. 9, another example of a system 900 in which wireless sensor 602 and controller 604 can be implemented is shown, according to an exemplary embodiment. In system 900, controller 604 is shown generating control signals $u_c$ for an indoor variable refrigerant flow (VRF) unit 902. Wireless sensor 602 may record measurements of measured variable $y_p$ and send measurements to controller 604. Wireless sensor 602 can be configured to send temperatures, setpoints, and other data associated with zone 702 to controller 604. Based on the information received from wireless sensor 602, controller 604 can be configured to generate control signals $u_c$ for indoor VRF unit 902. Indoor VRF unit 902 may send and receive refrigerant from outdoor VRF unit 904 via refrigerant conduits 906. Based on the refrigerant received from outdoor VRF unit 904, indoor VRF unit 902 can be configured to heat and/or cool zone 702 with the refrigerant. Indoor VRF unit 902 and outdoor VRF unit 904 may be part of a VRF system for zone 702 and the building that includes zone 702 (e.g., building 10). Based on the data received from wireless sensor 602, controller 604 can cause indoor VRF unit 902 to affect the environmental conditions of zone 702.

Wireless Sensor and Controller

Figure 10:
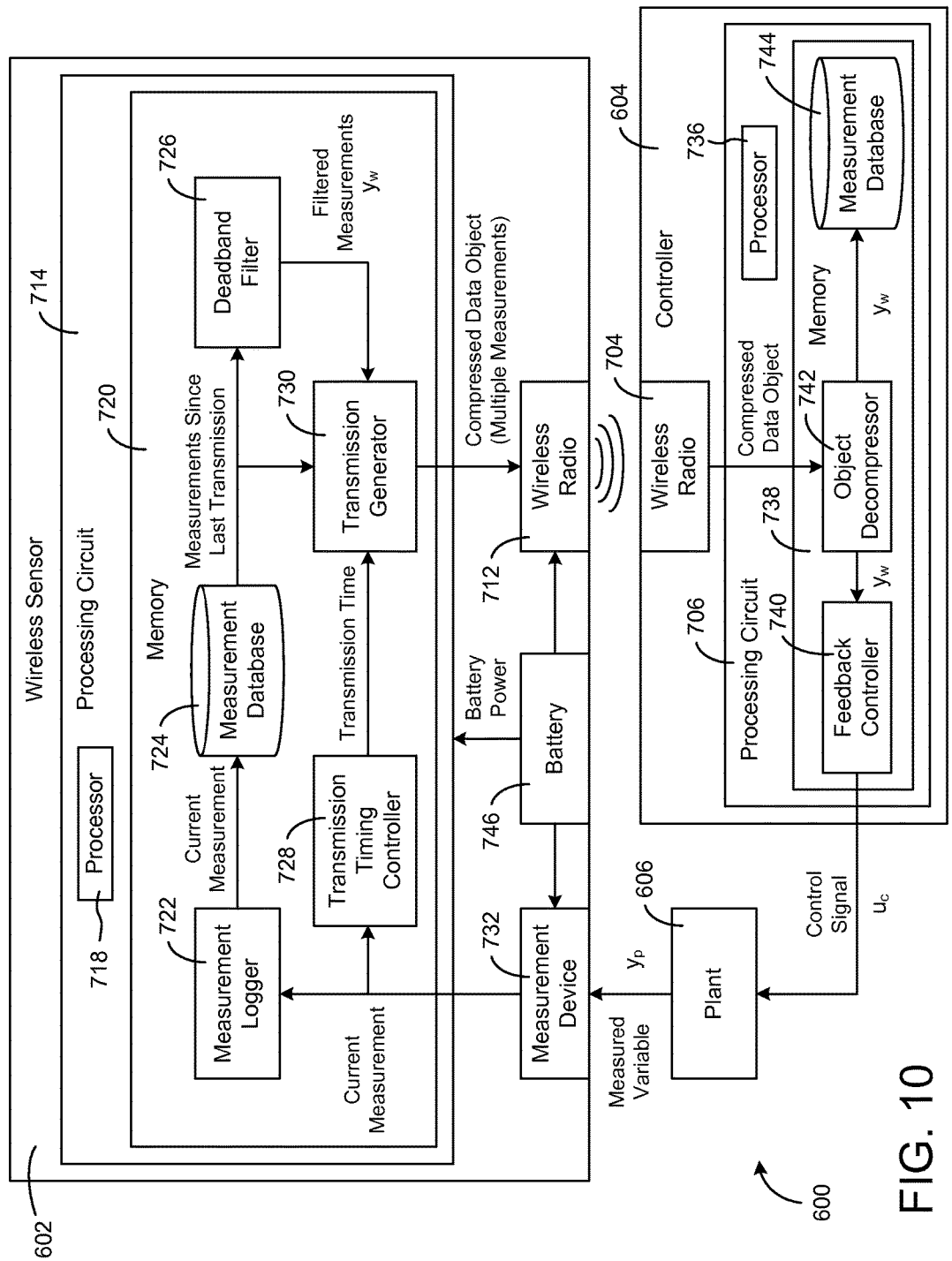
FIG. 10 is a block diagram illustrating the wireless sensor and controller of FIG. 6 in greater detail, according to some embodiments.

Referring now to FIG. 10, a block diagram illustrating wireless sensor 602 and controller 604 in greater detail is shown, according to an exemplary embodiment. Wireless sensor 602 is shown to include a measurement device 732, a wireless radio 712, a processing circuit 714, and a battery 704. Battery 704 can be configured to power the electronic components of wireless sensor 602. For example, battery 704 is shown providing battery power to measurement device 732, wireless radio 712, and processing circuit 714. Processing circuit 714 can be configured to conserve battery power by reducing the number and/or frequency of wireless data transmissions sent to controller 604.

Measurement device 732 can include any type of transducer, sensor, or other measurement device (e.g., a temperature sensor, humidity sensor, enthalpy sensor, pressure sensor, lighting sensor, flow rate sensor, voltage sensor, valve position sensor, etc.) configured to collect samples of measured variable $y_p$ from plant 606. In some embodiments, measurement device 732 is a temperature sensor configured to measure the temperature of building zone 702. For example, measurement device 732 may include a thermocouple, a thermistor, a resistance temperature detector and/or any combination thereof. In some embodiments, wireless sensor 602 includes multiple measurement devices 732, each configured to measure a different variable (e.g., temperature, humidity, pressure, etc.). In other embodiments, wireless sensor 602 includes a single measurement device 732 configured to measure a single measured variable $y_p$. In some embodiments, measurement device 732 includes an analog-to-digital converter or other electronics for converting measurements $y_p$ to digital values.

Wireless radio 712 can be configured to send data to controller 604. Specifically, wireless radio 712 can be configured to communicate with wireless radio 704 of controller 604. In various embodiments, wireless radio 712 can be configured to communicate via Wi-Fi, Zigbee (e.g., Zigbee IP, Zigbee Pro Green Power), Bluetooth, 2G, 3G, LTE, a local area network (LAN), a metropolitan area network (MAN), a wide area network (WAN) (e.g., the Internet), ad hoc wireless communication, and/or any other type of wireless communications protocol or network. As shown in FIG.

10, the data sent to controller 604 may include a compressed data object containing multiple measurements. The compressed data object may include multiple samples of the measured variable $y_p$ and/or multiple filtered measurements $y_w$. The generation of the compressed data object and the timing of transmissions sent by wireless radio 712 may be controlled by processing circuit 714.

Processing circuit 714 is shown to include a processor 718 and memory 720. Processor 718 can be a general purpose or specific purpose processor, an application specific integrated circuit (ASIC), one or more field programmable gate arrays (FPGAs), a group of processing components, or other suitable processing components. Processor 718 may be configured to execute computer code and/or instructions stored in memory 720 or received from other computer readable media (e.g., CDROM, network storage, a remote server, etc.).

Memory 720 can include one or more devices (e.g., memory units, memory devices, storage devices, etc.) for storing data and/or computer code for completing and/or facilitating the various processes described in the present disclosure. Memory 720 can include random access memory (RAM), read-only memory (ROM), hard drive storage, temporary storage, non-volatile memory, flash memory, optical memory, or any other suitable memory for storing software objects and/or computer instructions. Memory 720 can include database components, object code components, script components, or any other type of information structure for supporting the various activities and information structures described in the present disclosure. Memory 720 can be communicably connected to processor 718 via processing circuit 714 and can include computer code for executing (e.g., by processor 718) one or more processes described herein.

Wireless sensor 602 is shown to include a measurement logger 722 and a measurement database 724. Measurement logger 722 can be configured to log the measurements $y_p$ obtained by measurement device 732 in measurement database 724. In some embodiments, measurement device 732 obtains measurements $y_p$ at a regular interval, referred to herein as the measurement interval. For example, measurement device 732 may collect a measurement $y_p$ once per minute, once per second, or at any other measurement interval. In some embodiments, measurement logger 722 converts the measurements $y_p$ to data objects that include attributes describing the measurements $y_p$. For example, measurement logger 722 can generate a data object for each measurement $y_p$. Each data object may include a key attribute indicating the unique ID of wireless sensor 602 (e.g., "ConferenceRoom4_ZN-T"), a time attribute indicating the time at which the corresponding measurement $y_p$ was collected (e.g., "2017-05-22; 08:00:00"), and a value attribute indicating the value of the measured variable $y_p$ (e.g., 74° F.). Measurement logger 722 can store the measurements $y_p$ and/or the data objects based on the measurements $y_p$ in measurement database 724.

Wireless sensor 602 is shown to include a transmission timing controller 728. Transmission timing controller 728 can be configured to control (i.e., schedule) the times at which transmissions are sent to controller 604. The amount of time that elapses between transmissions to controller 604 is referred to herein as the transmission interval. The transmission interval may be a regular interval (e.g., once every ten minutes, once every hour, etc.) or an irregular interval (i.e., an interval that changes dynamically based on the values of the measured variable $y_p$). In some embodiments, the transmission interval is longer than the measurement interval such that multiple measurements $y_p$ are obtained by measurement device 732 and logged by measurement logger 722 during each transmission interval.

In some embodiments, the times at which transmissions are sent to controller 604 are dynamically determined by transmission timing controller 728 based on the values of measured variable $y_p$. For example, transmission timing controller 728 may determine that a transmission should be sent to controller 604 in response to a determination that the value of the measured variable $y_p$ has changed by a threshold amount since the last transmission was sent. This transmission timing strategy is referred to as send-on-delta (SOD) and is described in detail in U.S. patent application Ser. No. 15/618,492. The SOD strategy is summarized briefly in the following paragraphs.

Each time a sample of the measured variable $y_p$ is obtained, transmission timing controller 728 may compare the current value of the measured variable $y_{p,cur}$ to the most recent value of the measured variable $y_{p,prev}$ transmitted to controller 604. If the difference between $y_{p,cur}$ and $y_{p,prev}$ is greater than a threshold value $\delta$ (i.e., $|y_{p,cur}-y_{p,prev}|>\delta$), transmission timing controller 728 may determine that a new transmission should be sent to controller 604. However, if the difference between $y_{p,cur}$ and $y_{p,prev}$ is not greater than the threshold value $\delta$ (i.e., $|y_{p,cur}-y_{p,prev}|\leq\delta$), transmission timing controller 728 may determine that a new transmission should not be sent to controller 604.

In some embodiments, transmission timing controller 728 schedules transmissions to controller 604 such that the transmission interval $\Delta t_w$ is maintained between a minimum allowable transmission interval $\Delta t_w^{min}$ and a maximum allowable transmission interval $\Delta t_w^{max}$ (i.e., $\Delta t_w^{min} \leq \Delta t_w \leq \Delta t_w^{max}$). For example, each time a sample of the measured variable $y_p$ is obtained, transmission timing controller 728 may compare the time at which the sample of the measured variable $y_p$ is obtained (i.e., the current time $t_{cur}$) with the time at which the previous transmission was sent to controller 604 (i.e., the previous transmission time $t_{prev}$). Transmission timing controller 728 may calculate the difference $\Delta t_w$ between $t_{cur}$ and $t_{prev}$ (i.e., $\Delta t_w = t_{cur} - t_{prev}$) and compare the difference $\Delta t_w$ with $\Delta t_w^{min}$ and $\Delta t_w^{max}$.

If $\Delta t_w$ is less than $\Delta t_w^{min}$ (i.e., $\Delta t_w < \Delta t_w^{min}$), transmission timing controller 728 may determine that a new transmission should not be sent to controller 604, regardless of the value of the measured variable $y_p$. This ensures that at least a minimum time $\Delta t_w^{min}$ elapses between transmissions to controller 604. If $\Delta t_w$ is greater than $\Delta t_w^{min}$ (i.e., $\Delta t_w > \Delta t_w^{max}$), transmission timing controller 728 may determine that a new transmission should be sent to controller 604, regardless of the value of the measured variable $y_p$. This ensures that at most a maximum time $\Delta t_w^{max}$ elapses between transmissions to controller 604. If $\Delta t_w$ is between $\Delta t_w^{min}$ and $\Delta t_w^{max}$ (i.e., $\Delta t_w^{min} \leq \Delta t_w \leq \Delta t_w^{max}$), transmission timing controller 728 may compare the value of $y_{p,cur}$ with $y_{p,prev}$ to determine whether a new transmission should be sent. For example, transmission timing controller 728 may determine that a new transmission should be sent to controller 604 if the difference between $y_{p,cur}$ and $y_{p,prev}$ is greater than a threshold value $\delta$ (i.e., $|y_{p,cur}-y_{p,prev}|>\delta$), as previously described.

Figure 11:
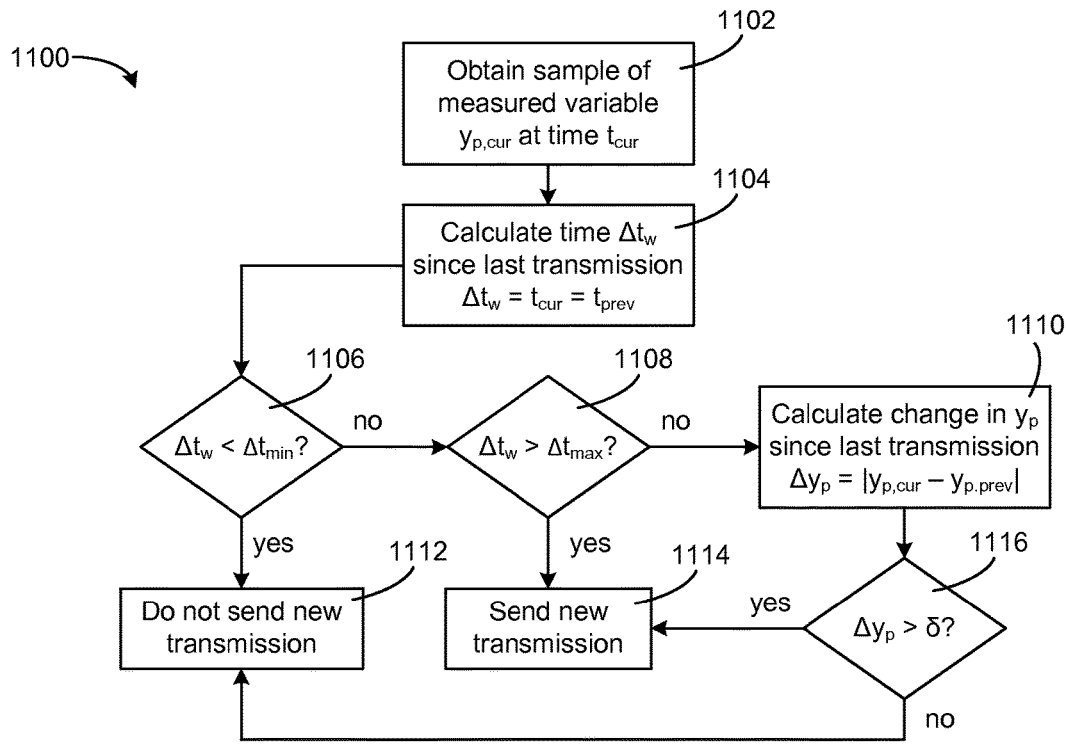
FIG. 11 is a flowchart illustrating a send-on-delta (SOD) process which can be performed by the wireless sensor of FIG. 6, according to some embodiments.

Referring now to FIG. 11, a flowchart illustrating the SOD process 1100 is shown, according to an exemplary embodiment. SOD process 1100 is shown to include obtaining a sample of the measured variable $y_{p,cur}$ at time $t_{cur}$ (step 1102) and calculating the amount of time $\Delta t_w = t_{cur} - t_{prev}$ that has elapsed since the last transmission to controller 604 (step 1104). If $\Delta t_w$ is less than a minimum time threshold $\Delta t_w^{min}$ (i.e., the result of step 1106 is "yes"), a new transmission is not sent (step 1112). However, if $\Delta t_w$ is not less than the minimum time threshold $\Delta t_w^{min}$ (i.e., the result of step 1106 is "no"), the elapsed time $\Delta t_w$ is compared to a maximum time threshold $\Delta t_w^{min}$ (step 1108).

If $\Delta t_w$ is greater than the maximum time threshold $\Delta t_w^{max}$ (i.e., the result of step 1108 is "yes"), a new transmission is sent (step 1114). However, if $\Delta t_w$ is not greater than the maximum time threshold $\Delta t_w^{max}$ (i.e., the result of step 1108 is "no"), the SOD process 1100 calculates a change in the measured variable $\Delta y_p = |y_{p,cur} - y_{p,prev}|$ since the last transmission (step 1110). If the change in the measured variable $\Delta y_p$ is greater than a threshold value δ (i.e., the result of step 1116 is "yes"), a new transmission is sent (step 1114). However, if the change in the measured variable $\Delta y_p$ is not greater than the threshold value δ (i.e., the result of step 1116 is "no"), then a new transmission is not sent (step 1112).

It should be noted that SOD technique is merely one example of a transmission timing technique which can be used to determine the times at which transmissions are sent to controller 604. It is contemplated that the systems and methods of the present disclosure can be used in combination with any sensor that obtains and transmits measurements asynchronously. For example, the systems and methods described herein can be used to transmit data from any sensor that obtains measurements at a rate faster than the sensor transmits measurements. Accordingly, the sensor may record multiple measurements between each transmission. Each transmission may include multiple measurements obtained since the previous transmission. The multiple measurements can be packaged into a single compressed data object and sent to controller 604 in a single transmission.

Figure 12:
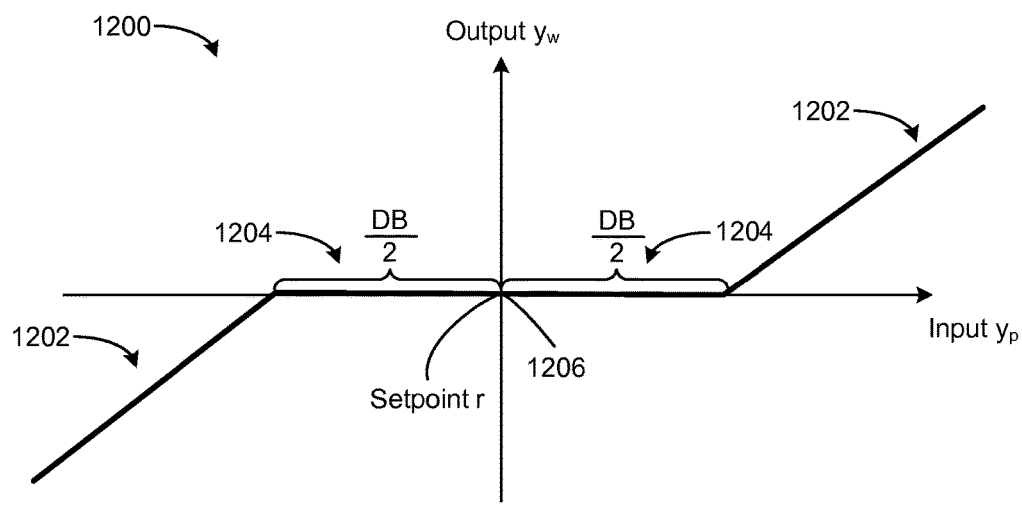
FIG. 12 is a graph illustrating the operation of a deadband filter to filter measurements collected by the wireless sensor of FIG. 6, according to some embodiments.

Referring now to FIGS. 10 and 12, wireless sensor 602 is shown to include a deadband filter 726. In some embodiments, deadband filter 726 is a component of wireless sensor 602. In other embodiments, deadband filter 726 is a component of controller 604. Deadband filter 726 can be configured to filter one or more of the measurements $y_p$ collected by wireless sensor 602 to generate one or more filtered measurements $y_w$. In some embodiments, deadband filter 726 determines whether each measurement $y_p$ is within a deadband range centered around a setpoint r for the measured variable $y_p$. The setpoint r can be provided as an input to wireless sensor 602 (e.g., if wireless sensor 602 is part of a thermostat) and/or controller 604.

If the measurement $y_p$ is within the deadband range $$\left(\text{i.e., } r - \frac{DB}{2} \le y_p \le r + \frac{DB}{2}\right),$$

deadband filter 726 may set the filtered measurement $y_w$ equal to the setpoint r. However, if the measurement $y_p$ is outside the deadband range $$\left(\text{i.e., } y_p < r - \frac{DB}{2} \text{ or } y_p > r + \frac{DB}{2}\right),$$

deadband filter 726 may add or subtract the deadband threshold $$\frac{DB}{2}$$

from the measurement $y_p$ to bring the filtered measurement $y_w$ closer to the setpoint r. The following equation illustrates the calculation which may be performed by deadband filter 726 to generate each filtered measurement $y_w$ as a function of the corresponding raw measurement $y_p$:

$$y_w = \begin{cases} r & \text{if } |r - y_p| \le \frac{DB}{2} \\ r - \text{sign}(r - y_p)\left(|r - y_p| - \frac{DB}{2}\right) & \text{if } |r - y_p| > \frac{DB}{2} \end{cases}$$

A graph 1200 illustrating the operation of deadband filter 726 is shown in FIG. 12. The horizontal axis of graph 1200 represents the measurement $y_p$ provided as an input to deadband filter 726, whereas the vertical axis of graph 1200 represents the filtered measurement $y_w$ provided as an output of deadband filter 726. The center point 1206 of graph 1200 is equal to the setpoint r for measured variable $y_p$. For example, if measured variable $y_p$ is a room temperature, and the setpoint r for the room temperature is 70° F., the center point 1206 of graph 1200 may have a value of 70° F.

Graph 1200 is shown to have two sections: a slope section 1202 and a deadband section 1204. Deadband section 1204 has a range of $$\pm \frac{DB}{2}$$

on either side or me setpoint r. If the input $y_p$ to deadband filter 726 falls within deadband section 1204

$$\left(\text{i.e., } r - \frac{DB}{2} \le y_p \le r + \frac{DB}{2}\right),$$

the output $y_w$ of deadband filter 726 is equal to the setpoint r. However, if the input $y_p$ to deadband filter 726 falls within slope section 1202, $$\left(\text{i.e., } y_p < r - \frac{DB}{2} \text{ or } y_p > r + \frac{DB}{2}\right),$$

the output $y_w$ of deadband filter is a linear function of the input $y_p$ and is shifted closer to the setpoint r by an amount equal to the deadband threshold $$\frac{DB}{2}.$$

For example, if the input $y_p$ falls within slope section 1202 and is less than the setpoint r, then the output $y_w$ is equal to $$y_p + \frac{DB}{2}.$$

However, if the input $y_p$ falls within slope section 1202 and is greater than the setpoint r, then the output $y_w$ is equal to $$y_p - \frac{DB}{2}.$$

Advantageously, deadband filter 726 operates to reduce the integrated error of the measured variable $y_p$ relative to the setpoint r by establishing a deadband section 1204 around the setpoint r $$\left(\text{i.e., } r \pm \frac{DB}{2}\right).$$

If the measurement $y_p$ falls within deadband section 1204, the filtered measurement $y_w$ will be equal to the setpoint r and the error $e=r-y_w$ will be equal to zero. This ensures that controller 604 will not accumulate a large integrated error (e.g., $\Sigma_{i=1}{}^n e_i$) over time for persistent values of $y_p$ within deadband section 1204.

In some embodiments, various components of wireless sensor 602 operate using the filtered measurements $y_w$ instead of the raw measurements $y_p$. For example, transmission timing controller 728 may use the filtered measurements $y_w$ instead of the raw measurements $y_p$ to determine whether a new transmission should be sent to controller 604. Similarly, measurement logger 722 and measurement database 724 can be configured to log and store the filtered measurements $y_w$. It is contemplated that these and other components of wireless sensor 602 can use the filtered measurements $y_w$ in place of the raw measurements $y_p$ or in addition to the raw measurements $y_p$ to perform the functions described herein with respect to each component of wireless sensor 602.

For embodiments in which deadband filter 726 is a component of controller 604, deadband filter 726 may receive the raw measurements $y_p$ transmitted by wireless sensor 602. For example, deadband filter 726 can receive one or more of the raw measurements $y_p$ extracted from a compressed data object transmitted to controller 604 from wireless sensor 602. Deadband filter 726 can process the raw measurements $y_p$ to generate filtered measurements $y_w$ and can provide the filtered measurements $y_w$ to feedback controller 740 for use in generating the control signal $u_c$ for plant 606. The operation of controller 604 is described in greater detail below.

Referring again to FIG. 10, wireless sensor 602 is shown to include a transmission generator 730. Transmission generator 730 can be configured to generate a compressed data object for transmission to controller 604. The compressed data object may contain multiple measurements, which may include the raw measurements $y_p$ and/or the filtered measurements $y_w$. For ease of explanation, the operation of transmission generator 730 will be described assuming that the filtered measurements $y_w$ are used to generate the compressed data object. However, it should be understood that transmission generator 730 may operate using the raw measurements $y_p$ in addition to or in place of the filtered measurements $y_w$ in various embodiments.

Transmission generator 730 is shown receiving a transmission time from transmission timing controller 728. The transmission time may indicate a time at which to generate and send a transmission to controller 604. The transmission time may indicate a future time at which to generate and send a compressed data object or may include a command to generate and transmit a compressed data object at the current time $t_{cur}$. Upon receiving the transmission time from transmission timing controller 728, transmission generator 730 may identify all of the measurements $y_w$ that have been obtained or generated since the previous time $t_{prev}$ at which a transmission was sent to controller 604. The set of measurements $y_w$ identified by transmission generator 730 may include all measurements $y_w$ obtained by wireless sensor 602 that have not yet been transmitted to controller 604. For example, if the previous transmission to controller 604 occurred at time $t_0$ (i.e., $t_{prev}=t_0$) and the current time is $t_5$ (i.e., $t_{cur}=t_5$), transmission generator 730 may identify all of the measurements $y_w$ obtained or generated after time $t_0$ up to and including time $t_5$ (e.g., measurements $y_w$ obtained at times $t_1$, $t_2$, $t_3$, $t_4$, and $t_5$).

Transmission generator 730 can generate a compressed data object that includes multiple measurements $y_w$. In some embodiments, each measurement $y_w$ is stored in the compressed data object as a key-time-value triplet. For example, each measurement $y_w$ may include a key indicating the unique ID of the sensor which recorded the measurement (e.g., wireless sensor 602), a value indicating the value of the measurement (e.g., 72° F.), and a time indicating the time at which the measurement was obtained (e.g., 2017-05-22; 08:00:00). Transmission generator 730 can be configured to compress the set of measurements $y_w$ included in the compressed data object and provide the compressed data object to wireless radio 712. Wireless radio 712 can transmit the compressed data object to controller 604.

Still referring to FIG. 10, controller 604 is shown to include a wireless radio 704 and a processing circuit 706. Wireless radio 704 may be configured to receive data transmitted wirelessly from wireless sensor 602. Specifically, wireless radio 704 may receive the compressed data object from wireless sensor 602 via wireless radio 712. Wireless radio 704 may be the same or similar to wireless radio 712. In various embodiments, wireless radio 704 can be configured to communicate via Wi-Fi, Zigbee (e.g., Zigbee IP, Zigbee Pro Green Power), Bluetooth, 2G, 3G, LTE, a local area network (LAN), a metropolitan area network (MAN), a wide area network (WAN) (e.g., the Internet), ad hoc wireless communication, and/or any other type of wireless communications protocol or network.

Processing circuit 706 is shown to include a processor 736 and memory 738. Processor 736 can be a general purpose or specific purpose processor, an application specific integrated circuit (ASIC), one or more field programmable gate arrays (FPGAs), a group of processing components, or other suitable processing components. Processor 736 may be configured to execute computer code and/or instructions stored in memory 738 or received from other computer readable media (e.g., CDROM, network storage, a remote server, etc.).

Memory 738 can include one or more devices (e.g., memory units, memory devices, storage devices, etc.) for storing data and/or computer code for completing and/or facilitating the various processes described in the present disclosure. Memory 738 can include random access memory (RAM), read-only memory (ROM), hard drive storage, temporary storage, non-volatile memory, flash memory, optical memory, or any other suitable memory for storing software objects and/or computer instructions. Memory 738 can include database components, object code components, script components, or any other type of information structure for supporting the various activities and information structures described in the present disclosure. Memory 738 can be communicably connected to processor 736 via processing circuit 706 and can include computer code for executing (e.g., by processor 736) one or more processes described herein.

Controller 604 is shown to include an object decompressor 742 and a measurement database 744. Object decompressor 742 can be configured to receive and decompress the compressed data object provided by wireless sensor 602. Object decompressor 742 can extract multiple measurements $y_w$ from the compressed data object and identify the key-time-value triplet associated with each measurement $y_w$. Object decompressor 742 can use the key of each measurement $y_w$ to identify the sensor from which the measurement $y_w$ was received. Similarly, object decompressor 742 can use the time attribute of each measurement $y_w$ to identify the time at which the measurement $y_w$ was obtained, and can use the value attribute of each measurement $y_w$ to identify the measured value. Object decompressor 742 can store the extracted measurements $y_w$ in measurement database 744, provide the measurements $y_w$ to feedback controller 740, and/or send the measurements $y_w$ to an external system or device (e.g., a remote analytics system, a supervisory controller, etc.).

Feedback controller 740 can be configured to use one or more of the measurements $y_w$ extracted from the compressed data object to generate a control signal $u_c$ for plant 606. In various embodiments, controller 740 can use a proportional control technique, a proportional-integral (PI) control technique, a proportional-integral-derivative (PID) control technique, a model predictive control (MPC) technique, an extremum-seeking control technique, or any other type of feedback control technique to generate the control signal $u_c$ as a function of the measurements $y_w$. Feedback controller 740 can provide the control signal $u_c$ to plant 606 for use in controlling one or more devices of plant 606. Plant 606 may operate in accordance with the control signal $u_c$ to adjust the value of measured variable $y_p$.

In some embodiments, feedback controller 740 includes an adaptive tuner configured to automatically tune controller 740. For example, if controller 740 is a PI controller, the adaptive tuner can be configured to adjust the proportional gain parameter and integral time parameter of the PI controller. In some embodiments, controller 740 is a pattern recognition adaptive controller (PRAC) with an integrated tuner. Several example of PRACs which can be used as controller 740 are described in detail in U.S. Pat. No. 5,506,768 filed Aug. 16, 1994, and U.S. Pat. No. 5,355,305 filed Oct. 29, 1992. The entire disclosures of these patents are incorporated by reference herein.

Example Graphs

Figure 13:
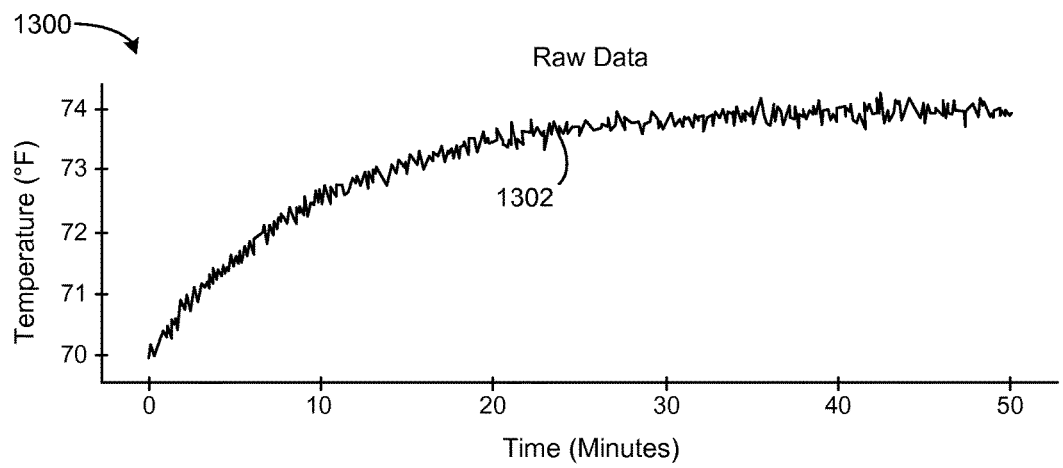
FIG. 13 is a graph of raw data illustrating the temperature of a building space over time, according to some embodiments.

Referring now to FIGS. 13-16, several graphs 1300-1600 illustrating the operation wireless sensor 602 are shown, according to an exemplary embodiment. FIG. 13 is a graph 1300 of raw data illustrating the temperature of a building space over time. Line 1302 is a continuous depiction of the temperature and represents the information that would be obtained from a sensor that continuously measures the temperature of the building space. Line 1302 has a moderate amount of noise representing the measurement noise of wireless sensor 602 and/or the process noise of plant 606.

Figure 14:
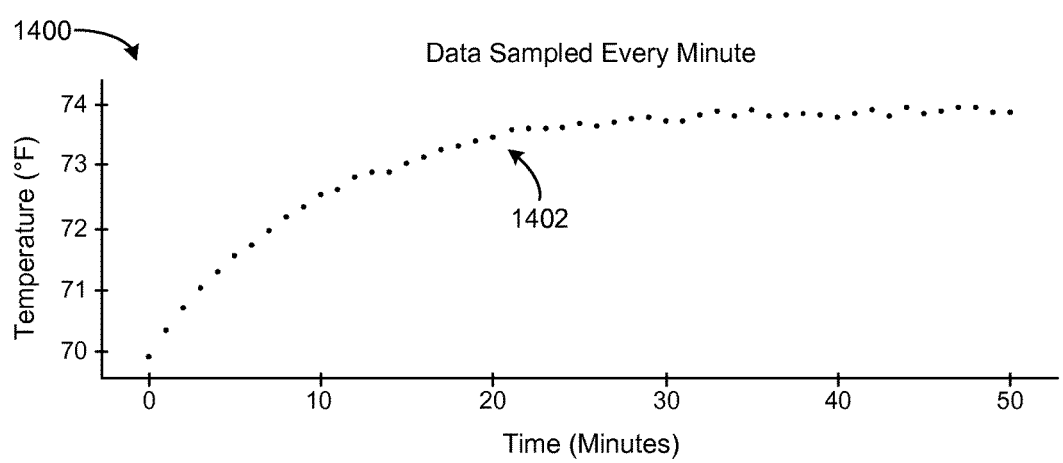
FIG. 14 is a graph of the temperature sampled every minute from the raw data of FIG. 13, according to some embodiments.

FIG. 14 is a graph 1400 of the temperature sampled every minute. Each sample 1402 is a sample of the continuous temperature data shown in graph 1300. The sampling period used to collect samples 1402 is one minute. In other words, each sample 1402 is obtained one minute after the previous sample. Over the fifty-minute sampling window, fifty samples 1402 may be collected (i.e., one sample each minute).

Figure 15:
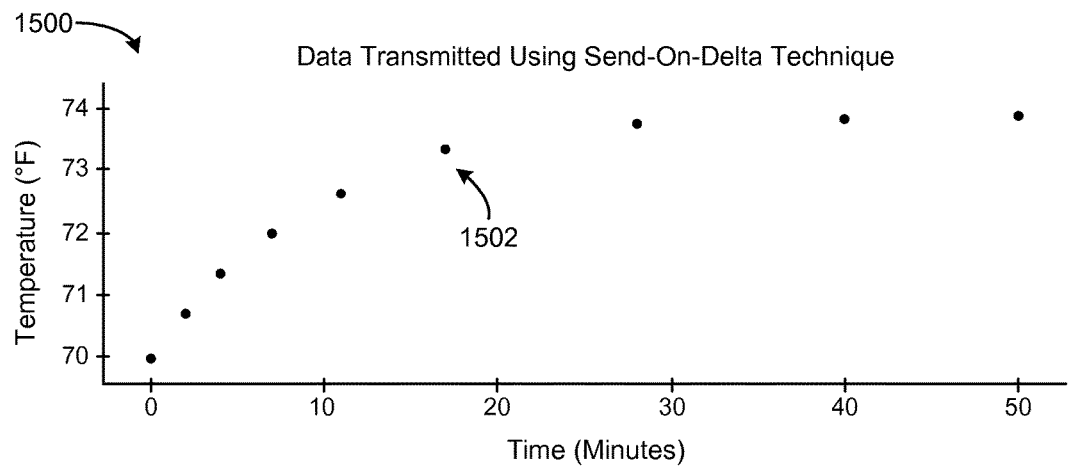
FIG. 15 is a graph of the temperature data collected as shown in FIG. 13 transmitted using the send-on-delta technique, according to some embodiments.

FIG. 15 is a graph 1500 of the temperature data transmitted using the send-on-delta technique. Each of the samples 1502 shown in graph 1500 represents the temperature of the building space at the corresponding time. The time between transmissions in graph 1500 is irregular. At the beginning of the fifty-minute window, the transmission period is approximately two minutes. However, as the temperature begins to approach steady-state, the amount of time required for the temperature to change by an amount exceeding the send-on-delta threshold δ increases, which results in a greater amount of time between transmissions. Near the end of the fifty-minute window, the temperature is not changing by an amount exceeding the threshold δ, but transmissions are sent when the amount of time since the previous transmission $\Delta t_w$ reaches the maximum time threshold $\Delta t_w^{max}$. In graph 1500, only nine samples 1502 are transmitted over the duration of the fifty-minute time window. Compared with the samples 1402 collected every minute shown in graph 1400, a significant amount of information is lost.

Figure 16:
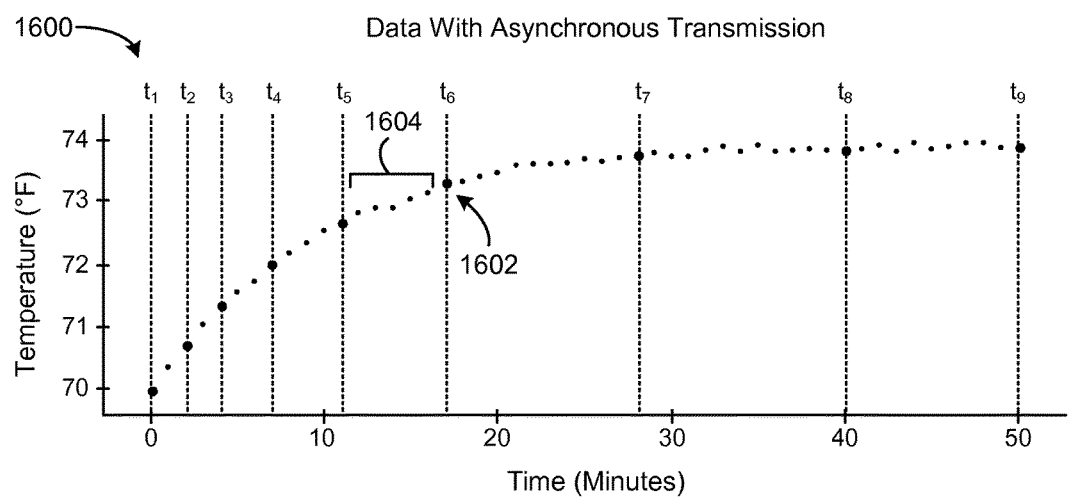
FIG. 16 is a graph of the data transmitted with the asynchronous transmission technique used by the wireless sensor of FIG. 6, according to some embodiments.

FIG. 16 is a graph 1600 of the data transmitted with the asynchronous transmission technique used by wireless sensor 602. Each of the vertical dotted lines in graph 1600 indicate a time at which a transmission is sent to controller 604. As shown, transmissions are sent at times $t_1$, $t_2$, $t_3$, $t_4$, $t_5$, $t_6$, $t_7$, $t_8$, and $t_9$. The transmission at time $t_1$ includes only a single sample collected at time $t_1$. The transmission at time $t_2$ occurs two minutes after $t_1$ and includes two samples (i.e., the sample collected at time $t_2$ and the sample collected between times $t_1$ and $t_2$) packaged into a single compressed data object. Similarly, the transmission at time $t_3$ occurs two minutes after $t_2$ and includes two samples (i.e., the sample collected at time $t_3$ and the sample collected between times $t_2$ and $t_3$) packaged into a single compressed data object.

As the temperature begins to approach steady-state, the amount of time required for the temperature to change by an amount exceeding the send-on-delta threshold δ increases, which results in a greater amount of time between transmissions. For example, the transmission at time $t_6$ occurs six minutes after the transmission at time $t_5$ and includes six samples of the temperature (i.e., the sample 1602 collected at time $t_6$ and the five samples 1604 collected between times $t_5$ and $t_6$). As the temperature change slows even further, the amount of time required for the temperature to change by an amount exceeding the send-on-delta threshold δ further increases, which leads to a longer time between transmissions. Each transmission may include a compressed data object containing the sample collected at the transmission time, as well as the samples collected since the previous transmission. For example, the transmission at time $t_7$ may include a compressed data file containing the sample collected at time $t_7$ as well as the samples collected between times $t_6$ and $t_7$.

Advantageously, the asynchronous data transmission used by wireless sensor 602 collects multiple samples between transmissions and sends multiple samples as part of a single transmission. The reduced number of transmissions reduces network traffic and reduces the amount of power required to transmit the samples to controller 604, which extends battery life. The complete data set sampled at the faster measurement interval (e.g., each minute) is preserved and sent to controller 604 asynchronously. This allows controller 604 to store the complete data set for use in data-based analytics, fault detection and diagnostics, system identification, noise estimation, and other applications that require the complete data set.

Asynchronous Data Transmission Process

Figure 17:
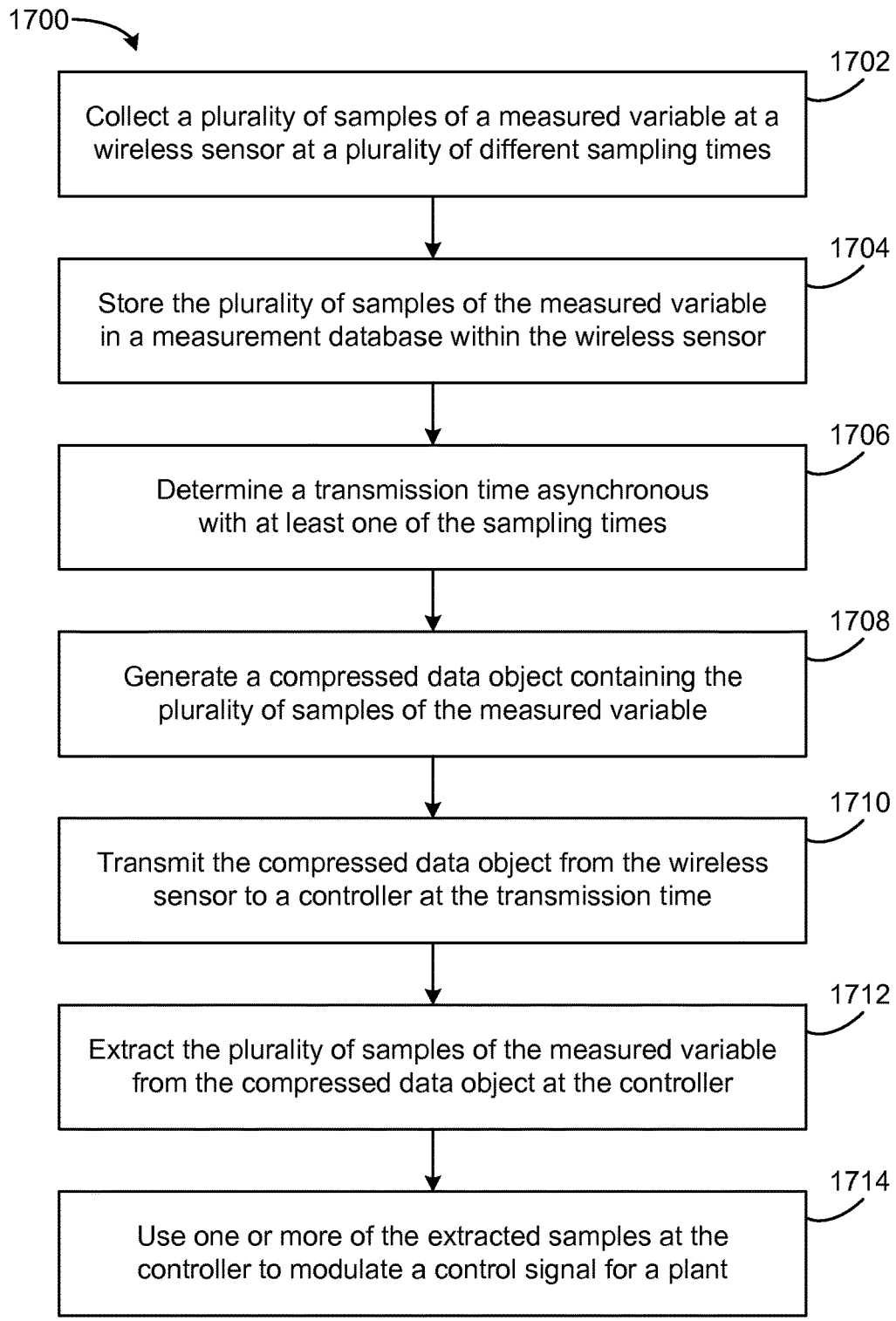
FIG. 17 is a flowchart of an asynchronous data transmission process which can be performed by the wireless sensor and/or the controller of FIG. 6, according to some embodiments.

Referring now to FIG. 17, a flowchart of an asynchronous data transmission process 1700 is shown, according to an exemplary embodiment. Process 1700 can be performed by one or more components of control system 600. For example, process 1700 can be performed by wireless sensor 602 and/or controller 604 as described with reference to FIGS. 6-16.

Process 1700 is shown to include collecting a plurality of samples of a measured variable at a wireless sensor at a plurality of different sampling times (step 1702). In some embodiments, an amount of time that elapses between each sampling time defines a sampling period. The sampling period may be regular (e.g., one sample per minute, one sample per second, etc.) or irregular (e.g., sample when requested, sample at random times, etc.). In some embodiments, the measured variable is an environmental variable of a building space (e.g., measured temperature, measured humidity, measured pressure, etc.) or a measured variable associated with the operation of building equipment (e.g., measured refrigerant temperature, measured compressor speed, measured airflow rate, etc.).

Process 1700 is shown to include storing the plurality of samples of the measured variable in a measurement database associated with the wireless sensor (step 1704). Each sample of the measured variable may include a key attribute, a value attribute, and/or a time attribute. The key attribute may identify the sensor that collected the sample and/or the measured variable associated with the sample. The time attribute may identify the time at which the sample was collected. The value attribute may identify the value of the measured variable at the corresponding sampling time.

Process 1700 is shown to include determining a transmission time asynchronous with at least one of the sampling times (step 1706). In other words, the transmission time may occur substantially later than at least one of the sampling times (e.g., several minutes after the sample is collected). In some embodiments, the transmission time is determined by transmission timing controller 728, as previously described. For example, the transmission time can be determined using a send-on-delta (SOD) technique. The SOD technique may include comparing each sample of the measured variable to the most recent value of the measured variable transmitted to the controller. If the difference between the current value of the measured variable and the most recently transmitted value exceeds a threshold, step 1706 may include triggering a transmission to controller 604.

Each time a sample of the measured variable $y_p$ is obtained, transmission timing controller 728 may compare the current value of the measured variable $y_{p,cur}$ to the most recent value of the measured variable $y_{p,prev}$ transmitted to controller 604. If the difference between $y_{p,cur}$ and $y_{p,prev}$ is greater than a threshold value $\delta$ (i.e., $|y_{p,cur}-y_{p,prev}|>\delta$), transmission timing controller 728 may determine that a new transmission should be sent to controller 604. However, if the difference between $y_{p,cur}$ and $y_{p,prev}$ not greater than the threshold value $\delta$ (i.e., $|y_{p,cur}-y_{p,prev}|\leq\delta$), transmission timing controller 728 may determine that a new transmission should not be sent to controller 604.

In some embodiments, transmission timing controller 728 schedules transmissions to controller 604 such that the transmission interval $\Delta t_w$ is maintained between a minimum allowable transmission interval $\Delta t_w^{min}$ and a maximum allowable transmission interval $\Delta t_w^{max}$ (i.e., $\Delta t_w^{min} \leq \Delta t_w \leq \Delta t_w^{max}$). For example, each time a sample of the measured variable $y_p$ is obtained, transmission timing controller 728 may compare the time at which the sample of the measured variable $y_p$ is obtained (i.e., the current time $t_{cur}$) with the time at which the previous transmission was sent to controller 604 (i.e., the previous transmission time $t_{prev}$). Transmission timing controller 728 may calculate the difference $\Delta t_w$ between $t_{cur}$ and $t_{prev}$ (i.e., $\Delta t_w = t_{cur} - t_{prev}$) and compare the difference $\Delta t_w$ with $\Delta t_w^{min}$ and $\Delta t_w^{max}$.

If $\Delta t_w$ is less than $\Delta t_w^{min}$ (i.e., $\Delta t_w < \Delta t_w^{min}$), transmission timing controller 728 may determine that a new transmission should not be sent to controller 604, regardless of the value of the measured variable $y_p$. This ensures that at least a minimum time $\Delta t_w^{min}$ elapses between transmissions to controller 604. If $\Delta t_w$ is greater than $\Delta t_w^{min}$ (i.e., $\Delta t_w > \Delta t_w^{max}$), transmission timing controller 728 may determine that a new transmission should be sent to controller 604, regardless of the value of the measured variable $y_p$. This ensures that at most a maximum time $\Delta t_w^{max}$ elapses between transmissions to controller 604. If $\Delta t_w$ is between $\Delta t_w^{min}$ and $\Delta t_w^{max}$ (i.e., $\Delta t_w^{min} \leq \Delta t_w \leq \Delta t_w$ transmission timing controller 728 may compare the value of $y_{p,cur}$ with $y_{p,prev}$ to determine whether a new transmission should be sent. For example, transmission timing controller 728 may determine that a new transmission should be sent to controller 604 if the difference between $y_{p,cur}$ and $y_{p,prev}$ is greater than a threshold value $\delta$ (i.e., $|y_{p,cur}-y_{p,prev}|>\delta$), as previously described.

Still referring to FIG. 17, process 1700 is shown to include generating a compressed data object containing the plurality of samples of the measured variable (step 1708). In some embodiments, step 1708 is performed at the transmission time determined in step 1706. The compressed data object may include each sample of the measured variable collected since the most recent transmission from wireless sensor 602 to controller 604. For example, step 1708 may include identifying all of the samples that have been collected since the previous time $t_{prev}$ at which a transmission was sent to controller 604. The set of samples identified in step 1708 may include all samples obtained by wireless sensor 602 that have not yet been transmitted to controller 604. For example, if the previous transmission to controller 604 occurred at time $t_0$ (i.e., $t_{prev}=t_0$) and the current time is $t_5$ (i.e., $t_{cur}=t_5$), step 1708 may include identifying all of the measurements $y_w$ obtained or generated after time $t_0$ up to and including time $t_5$ (e.g., measurements $y_w$ obtained at times $t_1$, $t_2$, $t_3$, $t_4$, and $t_5$).

In some embodiments, each sample in the compressed data object contains a key-time-value triplet. For example, each sample may include a key indicating the unique ID of the sensor which recorded the measurement (e.g., wireless sensor 602), a value indicating the value of the measurement (e.g., 72° F.), and a time indicating the time at which the measurement was obtained (e.g., 2017-05-22; 08:00:00). Step 1708 can include compressing the set of samples included in the compressed data object and providing the compressed data object to wireless radio 712.

Process 1700 is shown to include transmitting the compressed data object from the wireless sensor to the controller at the transmission time (step 1710) and extracting the plurality of samples of the measured variable from the compressed data object at the controller (step 1712). In some embodiments, step 1712 includes identifying the key-time-value triplet associated with each sample Step 1712 can include using the key of each sample to identify the sensor from which the sample was received. Similarly, step 1712 can include using the time attribute of each sample to identify the time at which the sample was obtained, and using the value attribute of each sample to identify the measured value. In various embodiments, step 1712 can include storing the extracted samples in measurement database 744, providing the samples to feedback controller 740, and/or sending the samples to an external system or device (e.g., a remote analytics system, a supervisory controller, etc.).

Process 1700 is shown to include using one or more of the extracted samples at the controller to modulate a control signal for a plant (step 1714). Step 1714 can include using a proportional control technique, a proportional-integral (PI) control technique, a proportional-integral-derivative (PID) control technique, a model predictive control (MPC) technique, an extremum-seeking control technique, or any other type of feedback control technique to generate the control signal $u_c$ as a function of the samples. Step 1714 can include providing the control signal $u_c$ to plant 606 for use in controlling one or more devices of plant 606. Plant 606 may operate in accordance with the control signal $u_c$ to adjust the value of measured variable $y_p$.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system with asynchronous wireless data transmission, the control system comprising:
    a wireless sensor comprising:
        a measurement device configured to collect a plurality of samples of a measured variable at a plurality of different sampling times;
        memory configured to store the plurality of samples of the measured variable;
        a transmission generator configured to generate a compressed data object comprising at least one of the plurality of samples of the measured variable or a filtered plurality of samples of the measured variable; and
        a wireless radio configured to transmit the compressed data object as a single transmission at a transmission time asynchronous with at least one of the sampling times; and
    a controller comprising:
        an object decompressor configured to extract at least one of the plurality of samples of the measured variable or the filtered plurality of samples of the measured variable from the compressed data object; and
        a feedback controller configured to use at least one of one or more of the extracted samples of the measured variable or one or more of the extracted filtered samples of the measured variable to modulate a control signal for a plant that operates to affect the measured variable.

2. The control system of claim 1, wherein the wireless sensor comprises a measurement database and a measurement logger configured to store the plurality of samples in the measurement database, wherein each sample stored in the measurement database comprises:
    a time attribute indicating the sampling time at which the sample is collected; and
    a value attribute indicating a value of the measured variable at the sampling time.

3. The control system of claim 1, wherein the transmission generator is configured to:
    use the time attributes of the samples stored in the measurement database to identify the sampling time at which each sample was collected; and
    select each of the samples that were collected between the transmission time and a previous transmission time for inclusion in the compressed data object.

4. The control system of claim 1, wherein:
    an amount of time that elapses between consecutive samples of the measured variable defines a sampling period;
    an amount of time that elapses between consecutive transmissions from the wireless sensor to the controller defines a transmission period; and the sampling period is substantially shorter than the transmission period such that multiple samples of the measured variable are collected within a single transmission period.

5. The control system of claim 4, wherein the wireless sensor comprises a transmission timing controller configured to:
set the transmission period to a fixed multiple of the sampling period; and
set the transmission time to be synchronous with an end of the transmission period.

6. The control system of claim 1, wherein the wireless sensor comprises a transmission timing controller configured to:
identify a value of the measured variable associated with each of the plurality of samples; and
dynamically set the transmission time based on one or more of the identified values of the measured variable.

7. The control system of claim 1, wherein the wireless sensor comprises a transmission timing controller configured to:
calculate a delta value upon collecting each sample of the measured variable, the delta value indicating an amount by which a current value of the measured variable deviates from a most recent value of the measured variable transmitted to the controller; and
cause the compressed data object to be generated and transmitted to the controller in response to a determination that the delta value exceeds a threshold value.

8. The control system of claim 1, wherein the compressed data object comprises each sample of the measured variable collected since a previous transmission time at which a previous compressed data object was sent from the wireless sensor to the controller.

9. The control system of claim 1, wherein the controller comprises a measurement database and the object decompressor is configured to store the extracted samples of the measured variable in the measurement database, wherein each sample stored in the measurement database comprises:
a time attribute indicating the sampling time at which the sample is collected;
a value attribute indicating a value of the measured variable at the sampling time; and
a key attribute identifying the wireless sensor that collected the sample.

10. The control system of claim 1, wherein the controller is configured to use the extracted samples of the measured variable to perform data-based analytics comprising at least one of fault detection and diagnostics, system identification, and noise estimation.

11. A method for asynchronously transmitting samples of a measured variable from a wireless sensor to a controller, the method comprising:
collecting a plurality of samples of the measured variable at the wireless sensor at a plurality of different sampling times;
storing the plurality of samples of the measured variable in memory of the wireless sensor;
generating, by the wireless sensor, a compressed data object comprising at least one of the plurality of samples of the measured variable or a filtered plurality of samples of the measured variable;
transmitting the compressed data object from the wireless sensor to the controller via a wireless radio as a single transmission at a transmission time asynchronous with at least one of the sampling times;
extracting at least one of the plurality of samples of the measured variable or the filtered plurality of samples of the measured variable from the compressed data object at the controller; and
using at least one of one or more of the extracted samples of the measured variable or one or more of the extracted filtered samples at the controller to modulate a control signal for a plant that operates to affect the measured variable.

12. The method of claim 11, further comprising storing the plurality of samples in a measurement database within the wireless sensor, wherein each sample stored in the measurement database comprises:
a time attribute indicating the sampling time at which the sample is collected; and
a value attribute indicating a value of the measured variable at the sampling time.

13. The method of claim 11, further comprising:
using the time attributes of the samples stored in the measurement database to identify the sampling time at which each sample was collected; and
selecting each of the samples that were collected between the transmission time and a previous transmission time for inclusion in the compressed data object.

14. The method of claim 11, wherein:
an amount of time that elapses between consecutive samples of the measured variable defines a sampling period;
an amount of time that elapses between consecutive transmissions from the wireless sensor to the controller defines a transmission period; and
the sampling period is substantially shorter than the transmission period such that multiple samples of the measured variable are collected within a single transmission period.

15. The method of claim 14, further comprising:
setting the transmission period to a fixed multiple of the sampling period; and
setting the transmission time to be synchronous with an end of the transmission period.

16. The method of claim 11, further comprising:
identifying a value of the measured variable associated with each of the plurality of samples; and
dynamically setting the transmission time based on one or more of the identified values of the measured variable.

17. The method of claim 11, further comprising:
upon collecting each sample of the measured variable, calculating a delta value indicating an amount by which a current value of the measured variable deviates from a most recent value of the measured variable transmitted to the controller; and
causing the compressed data object to be generated and transmitted to the controller in response to a determination that the delta value exceeds a threshold value.

18. The method of claim 11, wherein the compressed data object comprises each sample of the measured variable collected since a previous transmission time at which a previous compressed data object was sent from the wireless sensor to the controller.

19. The method of claim 11, further comprising storing the extracted samples of the measured variable in a measurement database within the controller, wherein each sample stored in the measurement database comprises:
a time attribute indicating the sampling time at which the sample is collected;
a value attribute indicating a value of the measured variable at the sampling time; and a key attribute identifying the wireless sensor that collected the sample.

20. The method of claim 11, further comprising using the extracted samples of the measured variable to perform data-based analytics comprising at least one of fault detection and diagnostics, system identification, and noise estimation.

* * * * *